(12) United States Patent
Gritz et al.

(10) Patent No.: US 7,136,081 B2
(45) Date of Patent: Nov. 14, 2006

(54) SYSTEM AND METHOD OF LINE SAMPLING OBJECT SCENE INFORMATION

(75) Inventors: Larry I. Gritz, Berkeley, CA (US); Craig Eugene Kolb, Berkeley, CA (US); Matthew Milton Pharr, San Francisco, CA (US); Eric Veach, Redwood City, CA (US)

(73) Assignee: NVIDIA Corporation, Santa Clara, CA (US)

(*) Notice: Subject to any disclaimer, the term of this patent is extended or adjusted under 35 U.S.C. 154(b) by 687 days.

(21) Appl. No.: 09/865,990

(22) Filed: May 25, 2001

(65) Prior Publication Data

US 2003/0038811 A1 Feb. 27, 2003

(51) Int. Cl.
G09G 5/00 (2006.01)

(52) U.S. Cl. ............ 345/619; 345/421; 345/422; 345/423; 345/426; 345/427; 345/611; 345/612; 345/613; 345/626; 345/627

(58) Field of Classification Search .......... 345/30, 345/34, 25, 609, 630, 634, 426, 611, 617, 345/614, 619, 443, 419, 626, 627, 421, 422, 345/423, 427, 612, 613; 382/317, 318, 312
See application file for complete search history.

(56) References Cited

U.S. PATENT DOCUMENTS

| | | | | |
|---|---|---|---|---|
| 4,897,806 A | * | 1/1990 | Cook et al. | 345/426 |
| 5,675,377 A | * | 10/1997 | Gibas | 348/47 |
| 6,088,036 A | * | 7/2000 | Morris | 345/428 |
| 6,577,312 B1 | * | 6/2003 | Deering et al. | 345/428 |
| 6,700,672 B1 | * | 3/2004 | Jones et al. | 358/1.1 |

OTHER PUBLICATIONS

D. Benson et al., "Octree Textures," *Association of Computing Machinery, Inc.*, pp. 785-790 (2002).
S.J. Gortler et al., "The Lumigraph," Proceedings of SIGGRAPH 96, Computer Graphics Proceedings, Annual Conference Series, ACM SIGGRAPH/Addison Wesley, pp. 43-52 (Aug. 1996).
I.E. Sutherland et al., "Characterization of Ten Hidden-Surface Algorithms," *Computing Surveys*, vol. 6, No. 1, pp. 1-55 (Mar. 1974).

* cited by examiner

*Primary Examiner*—Kimbinh T. Nguyen
(74) *Attorney, Agent, or Firm*—Townsend and Townsend and Crew LLP

(57) ABSTRACT

This invention relates generally to the art of computer graphics, and more specifically to the field of line sampling object scene information for the purpose of reconstructing an image of the object scene. In particular, the inventions distributes a set of line samples across an image plane such that the distribution of the set of line samples is non-regular. Additionally, the invention projects objects from an object scene onto an image plane and computes a view of the objects along each line sample in the set of line samples. Finally, the invention combines the view along each line sample in the set of line samples to form a view of the object scene.

131 Claims, 18 Drawing Sheets

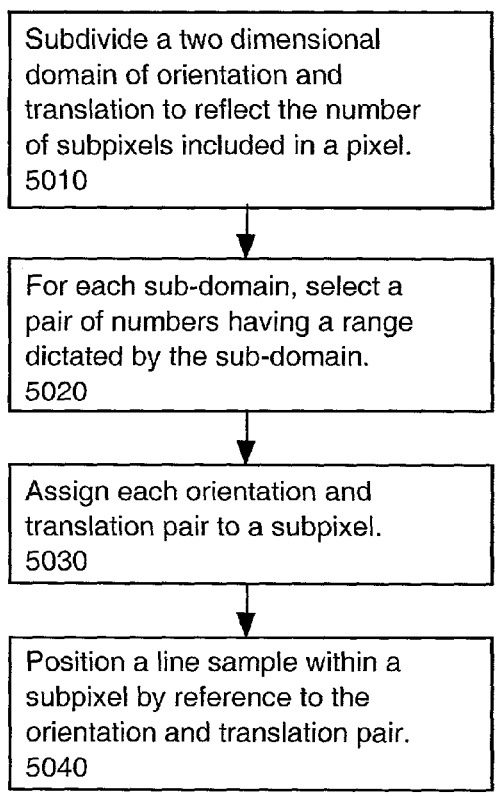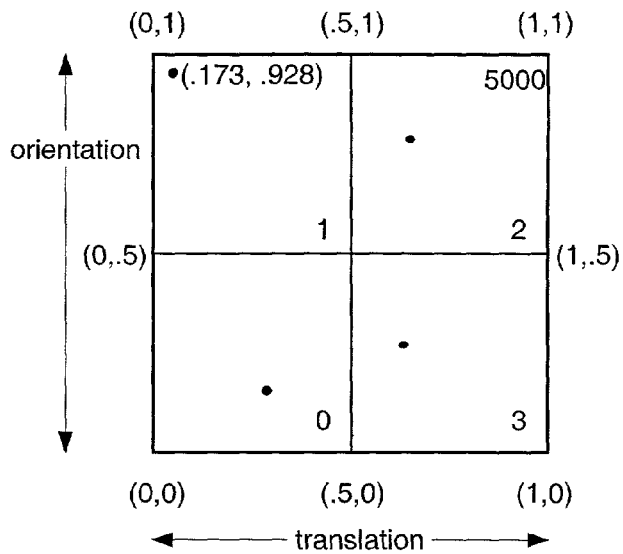
Figure 5A
Figure 5B
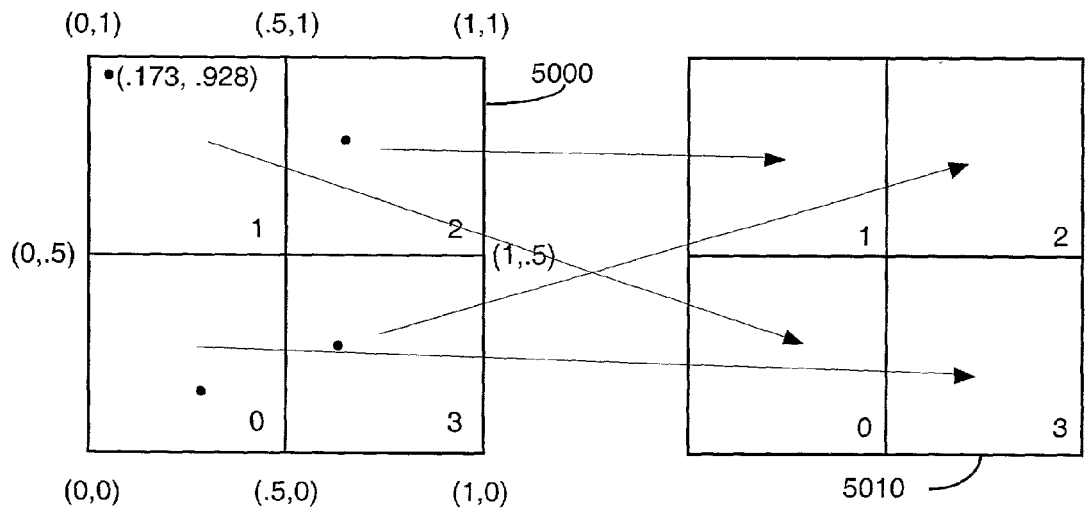
Figure 5C

SYSTEM AND METHOD OF LINE SAMPLING OBJECT SCENE INFORMATION

This invention relates generally to the art of computer graphics, and more specifically to the field of line sampling object scene information for the purpose of constructing an image of an object scene.

BACKGROUND OF THE INVENTION

One form of computer graphics is to develop a sequence of video image frames of an object scene from object scene information. The sources of object scene information include computer databases and computer programs. The object scene information includes visual characteristics of an object scene, such as color and movement. Typically, one or more programs comprising a renderer process object scene information.

More specifically, a video image frame includes a color value for each pixel of a monitor or display. Pixels are the smallest resolution element of the monitor or display. Processing object scene information corresponding to the general area of the pixel determines a color for a given pixel.

Computer graphics systems typically develop each video image frame of computer animated video by point sampling the general location of a given pixel in an object scene. Essentially, a renderer processes object scene information to calculate a color value of an object scene at an infinitesimal point within the object scene. The renderer then averages color values of a set of point samples in the general area of a pixel to compute a color for the pixel. The distribution or positioning of the point samples is either regular or non-regular. The renderer generally accomplishes a regular distribution with a rigid, evenly spaced grid of point samples. Off-setting each point sample in an otherwise evenly spaced grid by a pseudo-randomly determined amount is an example of a non-regular distribution of point samples.

Additionally, some computer graphics systems extend point sampling to simulate motion blur by distributing point samples within a period of time associated with a video image frame.

Furthermore, some computer graphics systems simulate depth of field by selecting, for a region of the image plane, a point through which to view an object scene on a simulated lens. The position of the point on the lens affects which objects in the object scene are projected onto the region of the image plane.

Other computer graphics systems reconstruct a view of an object scene by area averaging. Unlike the point sampling described above, area averaging calculates an actual view of an object scene in the general area of a pixel. The systems then compute a color value for the pixel from the view. The process is substantially more time consuming than point sampling, however, because these systems calculate a view of an entire area (instead of a set of points within the area).

Persons skilled in the art generally acknowledge that area averaging provides a more faithful reconstruction of a view of an object scene under certain circumstances than does point sampling. Point sampling, however, offers reduced computational complexity and allows for easy simulation of depth of field and motion blur. There is needed in the art, therefore, a means of reconstructing views of object scenes that provides the faithful image reconstruction of area averaging, but also provides reduced computational complexity and easy simulation of motion blur and depth of field.

SUMMARY OF THE INVENTION

In summary, the present invention is a system and method for line sampling object scene information for the purpose of reconstructing a view of the object scene. In particular, the invention distributes a set of line samples across an object scene such that the distribution of the set of line samples is non-regular. Additionally, the invention computes a view of the object scene along each line sample in the set of line samples. Finally, the invention combines the view along each line sample in the set of line samples to form a view of the object scene.

BRIEF DESCRIPTION OF THE DRAWINGS

Additional objects and features of the invention will be more readily apparent from the following detailed description and appended claims when taken in conjunction with the drawings, in which:

FIG. 5A illustrates processing steps that ensure a stratified distribution of line samples in a preferred embodiment of the invention.

FIG. 5B illustrates the selection of orientation and translation pairs wherein each orientation and translation pair is limited to a two-dimensional area such that a uniform distribution is achieved.

FIG. 5C illustrates the assignment of orientation and translation pairs to sub-pixels by reference to a non-regular sequence of numbers in an embodiment of the invention.

DESCRIPTION OF THE PREFERRED EMBODIMENTS

Figure 1A:
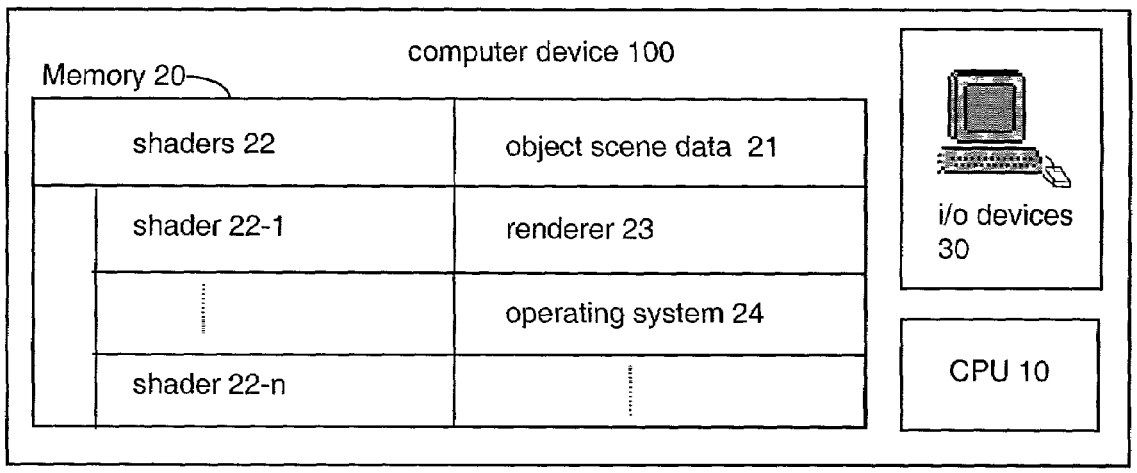
FIG. 1A is a block diagram of a computer system in accordance with an embodiment of the present invention.

FIG. 1A shows computer device 100. Computer device 100 is configured to execute the various embodiments of the present invention described below. Included in computer device 100 is central processing unit (CPU) 10, memory 20, and i/o devices 30. CPU 10 executes instructions as directed by operating system 24 and other programs maintained in memory 20 and sends control signals to various hardware components included in computer device 100.

Figure 1B:
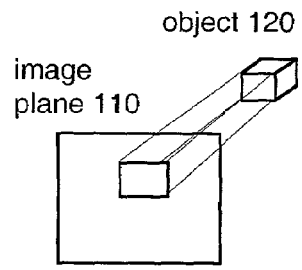
FIG. 1B illustrates the projection of an object onto an image plane in accordance with an embodiment of the present invention.

Memory 20 also includes object scene data 21. Object scene data 21 is static information that describes one or more object scenes. An object scene is one of many that, for example, comprise the scenes of computer animated video. For example, object scene data 21 may describe the actions and physical or visual attributes of characters (i.e., objects) in an object scene. In particular, object scene data 21 specifies locations of objects within an object scene through the use of x, y and z coordinates. The x and y coordinates represent the horizontal and vertical positions with respect to image plane 110 (of FIG. 1B). The z coordinate represents the distance of a point on an object from image plane 110. As illustrated in FIG. 1B, image plane 110 functions as a projection screen for object 120. Thus, image plane 110 facilitates a transformation of three-dimensional objects to a two-dimensional representation. Image plane 110 is analogous to a monitor or video display included in i/o devices 30. Positions on image plane 110 map to positions on a monitor or video display. Thus, references to pixels on image plane 110 are effectively references to pixels of a monitor or video display.

Object scene data 21 also includes, as noted above, information about the movement of an object during a period of time associated with an image frame. Typically, the time period associated with an image frame is proportional to the shutter speed of a camera. In other words, the amount of time for which a camera exposes a frame of film. Any movement that occurs during this time period results in a blurred video frame or picture. To capture object movement, object scene data 21 provides the position of an object at the beginning of the period of time associated with the image frame and its trajectory and velocity during the time period. This permits the calculation of the position of an object at any point during the period of time associated with the image frame.

Shaders 22 comprise one or more programs called shaders that also describe objects in an object scene. Shaders 22 are executable programs that typically provide information about the surfaces of objects in an object scene. For example, shaders 22 may be directed to calculate a color value of a location on the surface of an object in an object scene. The calculation of a color value preferably includes the consideration of an object's reflective and refractive qualities such as the extent of light diffusion upon reflection by the surface and the extent of light dispersion upon transmission through the surface.

Also included in memory 20 is renderer 23. Renderer 23 processes object scene data 21 in conjunction with shaders 22 to render computer animated video or still images as described below.

Also included in memory 20, but not illustrated in FIG. 1A, is space for temporary storage of data produced and required by renderer 23 during the process of rendering computer animated video and still images. Object scene data 21 and shaders 22 describe an object scene that renderer 23 samples in order to reconstruct an image or computer animated video. Renderer 23 stores a result of the rendering process in memory 20 and/or outputs it to i/o devices 30.

Figure 1C:
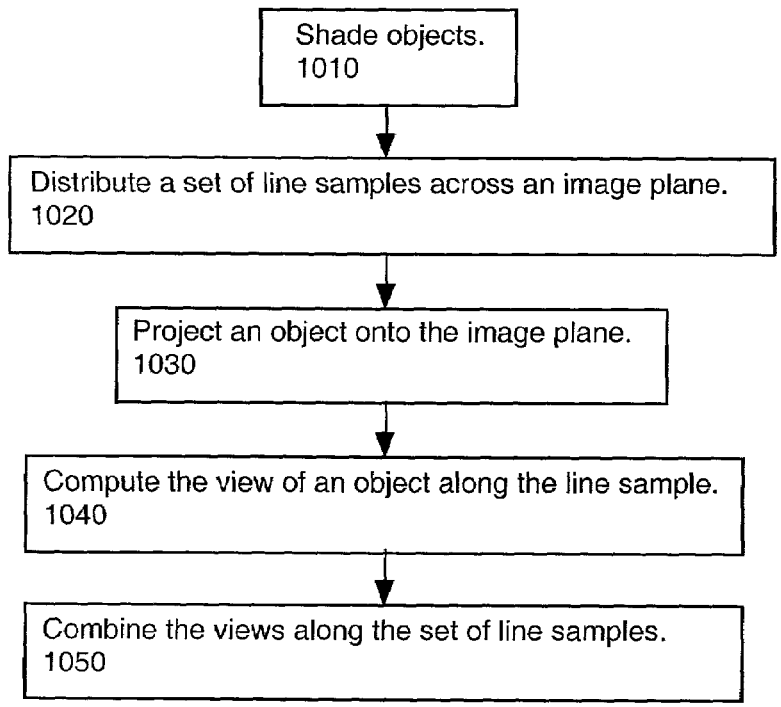
FIG. 1C illustrates processing steps for line sampling an object scene in accordance with an embodiment of the present invention.

In more detail, renderer 23 shades objects in an object scene (step 1010, FIG. 1C). Typically, this step includes processing object scene data 21 to determine which objects in an object scene are at least partially visible from image plane 110. To make this determination, renderer 23 queries object scene data 21 to ascertain the z-depth value of a given object. The z-depth value is the minimum distance of an object from image plane 110. Renderer 23 derives the z-depth value from the z coordinate discussed above. Renderer 23 also maintains in memory 20 "z-far" values associated with various regions of image plane 110. A z-far value represents the furthest distance of a visible object from image plane 110. Initially, each z-far value is set to infinity. Accordingly, every object in an object scene has a z-depth value that is less than the initial z-far values. However, as objects in an object scene are processed (as described in more detail below) an entire region of image plane 110 is associated with an object. After this occurs, renderer 23 sets the z-far value associated with that region to a finite value. Examples of such regions include: a sub-pixel, a group of sub-pixels, a pixel, a group of pixels, and image plane 110 itself.

Once a z-far value associated with a given region is set to a finite value, renderer 23 compares the z-depth value of an object within this region before processing the object. If the z-depth value exceeds the z-far value, the object is not visible from image plane 110.

To improve the efficiency of the processing steps described below, renderer 23 may transform some objects to less complex representations. For example, renderer 23 transforms some objects to polygonal mesh representations. A polygonal mesh is a collection of edges, vertices, and polygons. Additionally, renderer 23 transforms some objects or object representations to patches of nonuniform rational B-Splines ("NURB"). A NURB is a curve that interpolates data. Thus, given a set of points, a curve is generated passing through all the points. A NURB patch is a polynomial representation. Thus, a NURB patch uses functions of a higher-degree than a polygonal mesh representation, which uses linear functions. The NURB patch representation is temporary, however, as it is diced to create grids of various pixel-sized shapes such as micropolygons.

After determining which objects are visible from image plane 110 and, if necessary, converting some of the objects to grids of micropolygons, renderer 23 computes one or more color values for various parts of an object. In the case of a grid of micropolygons, renderer 23 determines a color value for each micropolygon in the grid of micropolygons.

The process typically begins with renderer 23 directing shaders 22 to calculate a color value for an object at a given location. As noted above, shaders 22 describe surface properties of an object, which affect the color value of an object. In response, shaders 22 often request renderer 23 to trace a ray (e.g., ray of light) to determine what is visible along the ray. The result of the tracing step is a factor in the determination of a color value for an object. The surface of the object that renderer 23 is shading may have various color-related properties that are processed in conjunction with the light source and shadow data and the objects reflected or refracted by the object being shaded to arrive at the color value.

An object scene typically includes light sources that cast light source rays directly or indirectly onto objects included in the object scene. Additionally, an object in an object scene often obstructs light source rays such that shadows are cast on other objects in the object scene. The presence of shadows, or lack thereof, affects the color value computed for an object. Accordingly, renderer 23 accounts for this effect by positioning points on a light source and tracing a light source ray from each point to an object being shaded. While tracing each light source ray, renderer 23 processes object scene data 21 to determine if the ray intersects another object. If so, a shadow is cast on the object being shaded. As indicated above, renderer 23 takes this into account when computing a color value for an object.

Another aspect of the shading process relates to refraction and reflection. Refraction is the turning or bending of a ray of light as it passes through an object. Reflection is the redirecting of light by an object. Because of the diffuse nature of most objects, objects tend to spread about or scatter light rays by reflection or refraction when the light source rays intersect the objects. To avoid processing all the possible directions of reflected or refracted light source rays, renderer 23 selects an angle of reflection or refraction. Once the angle is selected for the ray of refracted or reflected light, renderer 23 traces a ray of light from the object being shaded at the selected angle into the object scene. Renderer 23 determines which object(s) in the object scene are struck by the ray of light. Any such objects may then reflect or refract the traced ray of light. Thus, renderer 23 repeats this process of selecting an angle of reflection or refraction, and continues tracing. A color value assigned to the light source ray is affected by the object(s) that are struck by the light source ray.

Eventually, renderer 23 combines information from a variety of sources to compute a color value. Additionally, renderer 23 obtains a transparency value of the object from object scene data 21. To summarize step 1010, renderer 23 shades objects in an object scene that are at least partially visible from image plane 110. Memory 20 maintains information related to this step for subsequent processing.

In the next processing step, renderer 23 distributes a set of line samples across image plane 110 (step 1020). Renderer 23 uses a non-regular sequence of numbers when distributing line samples to eliminate or minimize "aliasing."

Figure 2A:
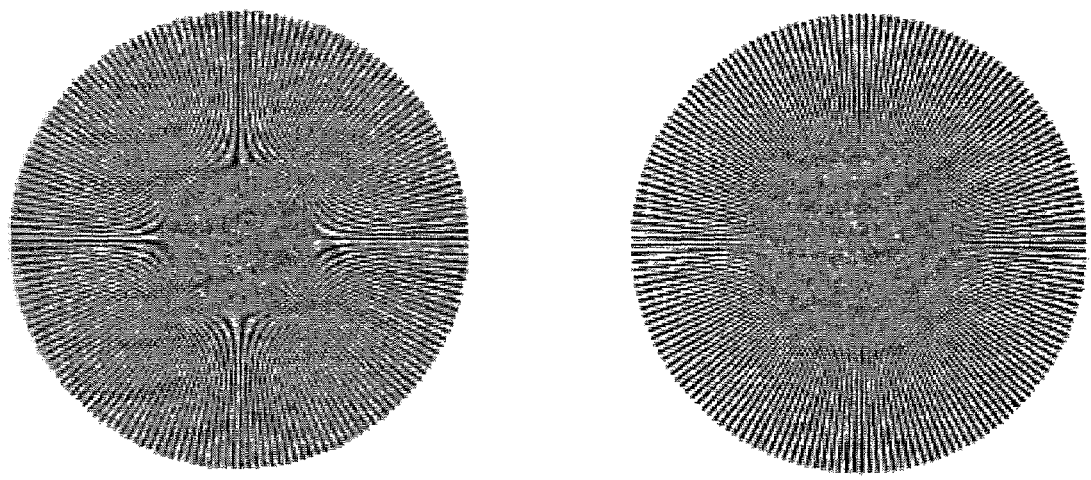
FIG. 2A illustrates sampling based on a non-regular sequence of numbers and sampling based on a regular sequence of numbers.

Aliasing often results when an object scene containing sharp changes is approximated with discrete samples. The failure to include an element of non-regularity (e.g., a non-regular sequence of numbers) into the sampling process aggravates the aliasing problem. More specifically, sampling based on a regular sequence of numbers results in low-frequency patterns that are not part of the sampled image and easily detectable by the human eye. Sampling based on a non-regular sequence of numbers results in high-frequency patterns that are not as easily detectable by the human eye. FIG. 2A illustrates sampling based on regular and non-regular sequences of numbers. The image on the left is a product of sampling based on a regular sequence of numbers and the image on the right is a product of sampling based on a random sequence of numbers. In the image on the right, the center portion of the image is fuzzy or gray, but the center portion of the image on the left includes swirling patterns. The swirling patterns are an example the low-frequency patterns mentioned above, and are a manifestation of aliasing. The fuzzy or gray portion of the image on the right are an example of the high-frequency patterns mentioned above, and are also a manifestation of aliasing. However, persons skilled in the art generally agree that for most applications, high-frequency patterns are much preferable to low-frequency patterns.

The non-regular sequence of numbers used to avoid or minimize low frequency patterns is preferably a pseudo-random sequence of numbers ("PRSN") or a low discrepancy sequence of numbers ("LDSN"). A PRSN matches that of a random sequence of numbers over a finite set of numbers. A LDSN avoids certain drawbacks of a PRSN. Mainly, a PRSN often includes a short sequence of clustered numbers (e.g., 1, 4, 4, 4, 2, etc.) that results in neighboring line samples having a similar position. A LDSN by definition is not random. Instead, a LDSN is a uniform distribution of numbers that is not regular, but that does not have the number-clustering associated with random sequences of numbers. In other words, a LDSN is more uniform than a PRSN.

Some embodiments of the present invention include a LDSN or PRSN in memory 20. In these embodiments, renderer 23 steps through a sequence of numbers maintained in memory 20 to obtain numbers for sampling information in object scene data 21. The sequence of numbers is thus ideally large enough to avoid short term repetitiveness. In other embodiments, renderer 23 directs CPU 10 and operating system 24 to compute a sequence of numbers as needed.

Another element of preferred embodiments of the present invention is subdividing a pixel to position one or more line samples within each sub-pixel. In this regard, confining one or more line samples to sub-pixels provides for a more uniform or stratified distribution of line samples (i.e., minimizes line sample clustering). A more uniform distribution of line samples minimizes the possibility of line samples missing objects or changes in an object.

Figure 2B:
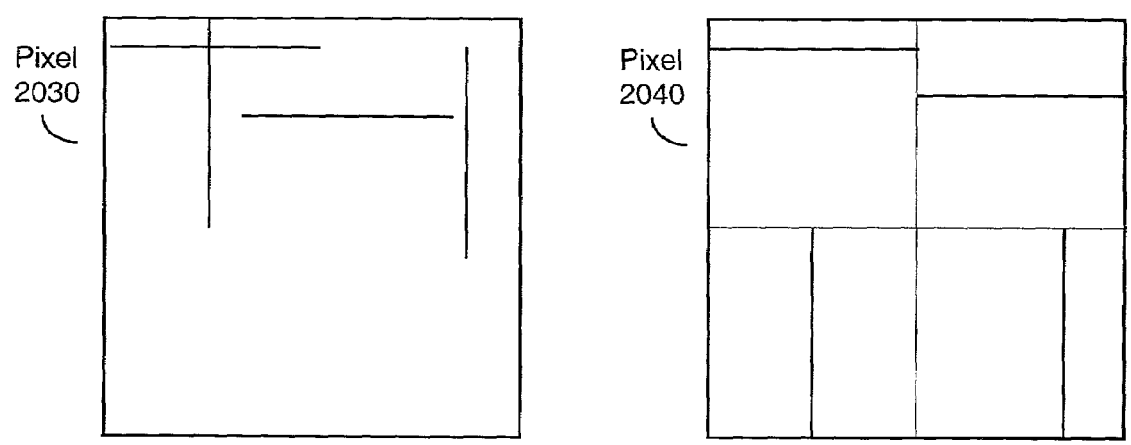
FIG. 2B illustrates a two distributions of line samples, wherein the distribution on the right uses sub-pixels to further ensure a stratified distribution.

Consider pixel 2030 of FIG. 2B. Because pixel 2030 lacks subdivisions, line samples can cluster within a region of pixel 2030. In this example, the line samples distributed within pixel 2030 miss all objects or changes in the object scene confined to the lower region of pixel 2030. In contrast, pixel 2040 includes four sub-pixels. Renderer 23 distributes a single line sample within each of these sub-pixels. Accordingly, the line samples are less likely to miss objects or changes in the object scene that are confined to the lower region of pixel 2030.

Figure 3A:
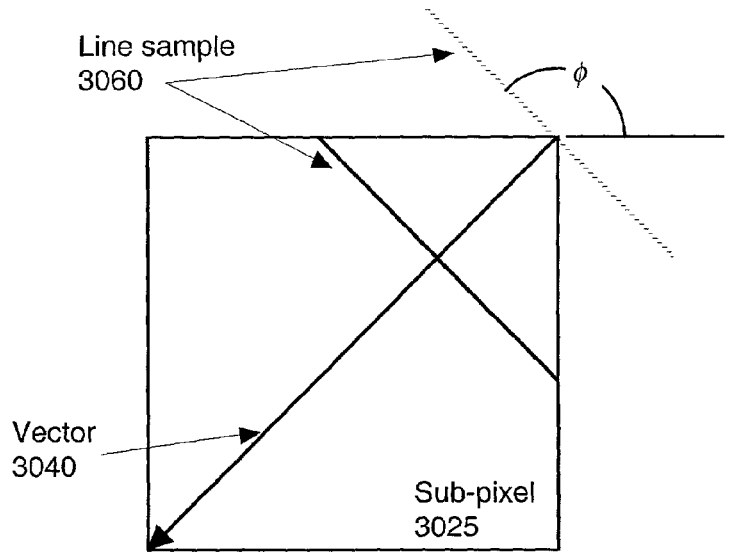
FIG. 3A illustrates an embodiment of the present invention in which an orientation and translation amount are selected in accordance with an embodiment of the present invention.

In another embodiment of the present invention, renderer 23 selects an orientation and translation amount by reference to a non-regular sequence of numbers to position a line sample. FIG. 3A illustrates line sample 3060 sampling sub-pixel 3025 in accordance with this embodiment of the present invention. Renderer 23 selects an orientation above a horizontal axis of sub-pixel 3025. In FIG. 3A, the selected orientation is 135-degrees and represented as φ. Initially, renderer 23 positions line sample 3060 at a translation origin of sub-pixel 3025 as illustrated by the lightly-shaded line sample 3060 in FIG. 3A. From this position, renderer 23 extends vector 3040 perpendicularly from line sample 3060. Renderer 23 then selects a translation amount. Renderer 23 translates line sample 3060 along vector 3040 by the selected translation amount to a position within sub-pixel 3025 as illustrated by the darkly-shaded line sample 3060 in FIG. 3A. In effect, renderer 23 selects a plane with the selected orientation through which line sample 3060 passes. Renderer 23 preferably maintains the 135-degree orientation of line sample 3060 as it translates line sample 3060 along vector 3040.

Figure 3B:
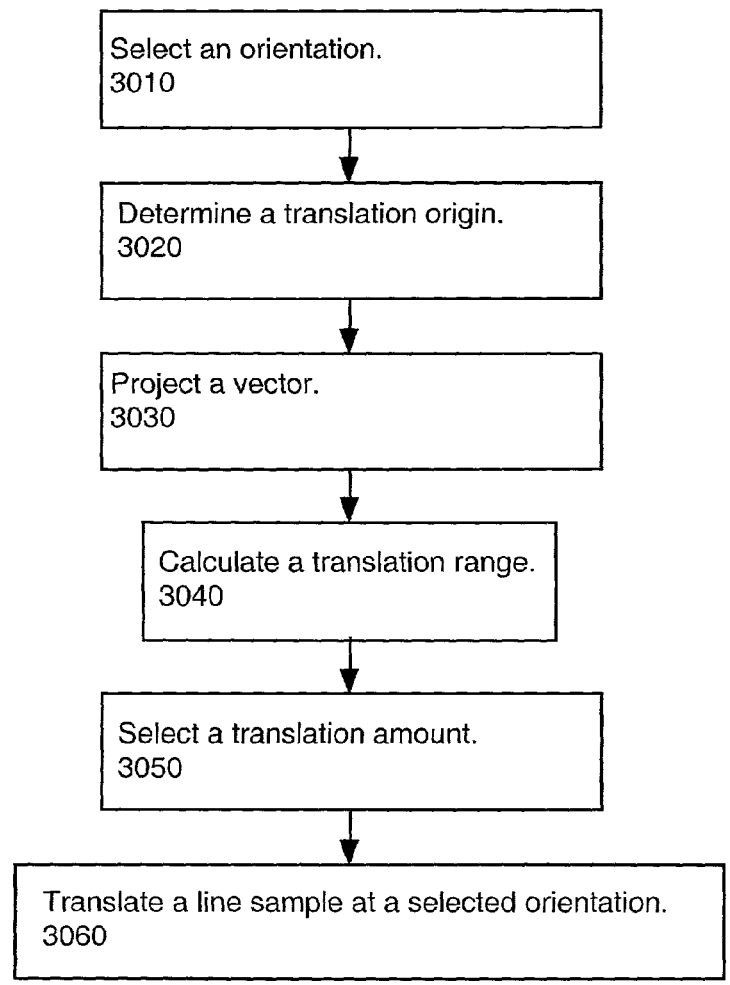
FIG. 3B illustrates processing steps in an embodiment of the present invention in which an orientation and translation amount are selected by reference to a non-regular sequence of numbers.

Attention now turns to a more detailed description of this embodiment of the invention. In a first processing step, renderer 23 selects an orientation by reference to a non-regular sequence of numbers (step 3010, FIG. 3B). Preferably, the sequence of numbers is a PRSN or LDSN. Typically, each number in the sequence of numbers is a fractional number between zero and one. Renderer 23 multiplies this number by a range of numbers suitable for the task at hand. In this embodiment, the range of acceptable orientations is 0 to 180-degrees. Accordingly, renderer 23 multiplies a number from the non-regular sequence of numbers by 180.

Figure 3C:
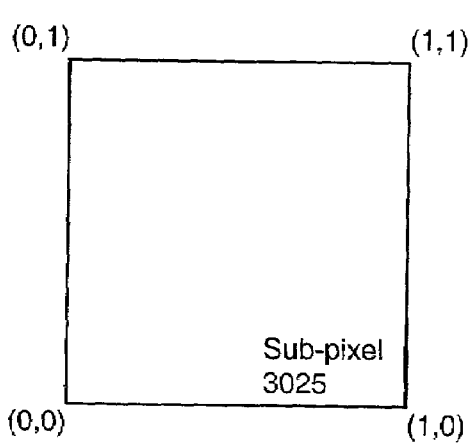
FIG. 3C illustrates a sub-pixel consistent with an embodiment of the present invention.

In a next step, renderer 23 determines a translation origin of the sub-pixel (step 3020). The orientation selected in step 3010 dictates the outcome of this step. FIG. 3C illustrates the four translation origins of sub-pixel 3025. Note that in this illustration, the dimensions of sub-pixel 3025 are set to one as an arbitrary unit of measure.

Figure 3D:
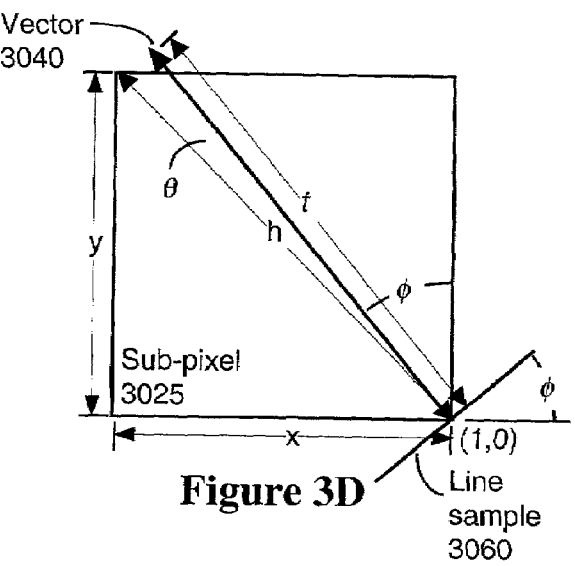
FIG. 3D illustrates an embodiment of the present invention in which an orientation and translation amount are selected in accordance with an embodiment of the present invention and a line sample is translated along a vector originating in the (1,0) translation origin.

For an orientation greater than or equal to 0-degrees but less than 45-degrees, renderer 23 selects translation origin (1,0). This means that renderer 23 translates a line sample 3060 having an orientation within this range from a position beginning at translation origin (1,0) as illustrated in FIG. 3D (φ is equal to 30-degrees). For an orientation greater than or equal to 45-degrees but less than 90-degrees, renderer 23 selects translation origin (0,1). For an orientation greater than or equal to 90-degrees but less than 135-degrees, renderer 23 selects translation origin (0,0). And for an orientation greater than or equal to 135-degrees but less than 180-degrees, renderer 23 selects translation origin (1,1). Table 1 summarizes these translation origin selection rules.

TABLE 1

| Orientation (φ) | Translation origin |
| --- | --- |
| 0 ≦ φ < 45 | (1, 0) |
| 45 ≦ φ < 90 | (0, 1) |
| 90 ≦ φ <135 | (0, 0) |
| 135 ≦ φ <180 | (1, 1) |

In a next step, renderer 23 projects vector 3040 into sub-pixel 3025 from translation origin (1,0) in a direction that is perpendicular to line sample 3060 (step 3030). Specifically, for the example illustrated in FIG. 3D, vector 3040 has an orientation of 120-degrees above the horizontal axis of sub-pixel 3025.

Renderer 23 then calculates a translation range for line sample 3060 (step 3040). The size of the sub-pixel and the selected orientation dictate the translation range. Specifically, the translation range assures that at least a portion of line sample 3060 crosses sub-pixel 3025 after renderer 23 translates line sample 3060.

In FIG. 3D, t represents the translation range of line sample 3060. Because vector 3040 is perpendicular to line sample 3060, the angle between the vertical axis of sub-pixel 3025 that passes through translation origin (1,0) and vector 3040 is equal to φ as well. Additionally, the angle between hypotenuse h and the vertical axis of sub-pixel 3025 that passes through translation origin (1,0) is 45-degrees. Thus θ is equal to 45-degrees minus φ as indicated in FIG. 3D.

Renderer 23 therefore calculates translation range t with the following equation:

$$t = h \times \cos(\theta) \quad (1)$$

where
$h = \sqrt{x^2 + y^2}$,
x=the width of sub-pixel 3025,
y=the height of sub-pixel 3025, and
θ=45°−φ
Thus, $$t = \sqrt{x^2 + y^2} \times \cos(\theta) \quad (2)$$

where θ=45°−φ

Once translation range t is determined, renderer 23 multiplies translation range t by a number from a non-regular sequence of numbers (step 3050). As noted above, each number from the non-regular sequence of numbers is between zero and one, so the actual translation amount is a fraction of translation range t.

Renderer 23 then translates line sample 3060 along vector 3040 by an amount determined in step 3050 (step 3060). Preferably, renderer 23 does not alter the orientation of line sample 3060 during the translation process. Additionally, renderer 23 preferably extends line sample 3060 to the borders of sub-pixel 3025 as illustrated in FIG. 3D.

Figure 3E:
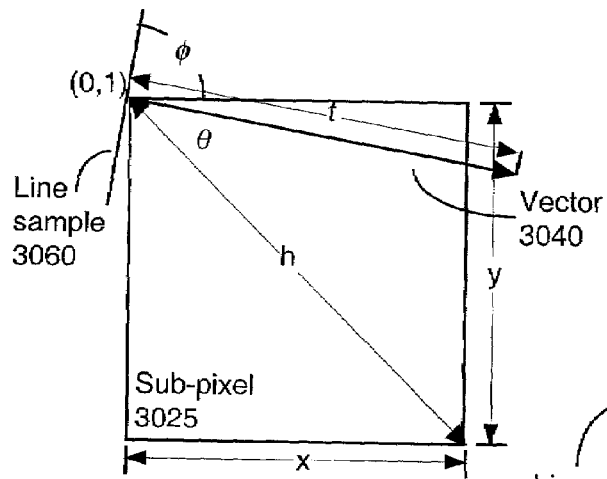
FIG. 3E illustrates an embodiment of the present invention in which an orientation and translation amount are selected in accordance with an embodiment of the present invention and a line sample is translated along a vector originating in the (0,1) translation origin.

The process of determining translation range t is essentially the same for the other three origins. The only distinction worth noting is that θ is different for each translation origin. For example, FIG. 3E shows line sample 3060 with an orientation of 60-degrees above a horizontal axis of sub-pixel 3025. Consistent with Table 1, line sample 3060 initially passes through the (0,1) translation origin. Consistent with the illustration of angles in FIG. 3E, the equation for determining the translation range t is as follows:

$$t = \sqrt{x^2 + y^2} \times \cos(\theta) \quad (3)$$

where θ=φ−45°

Figure 3F:
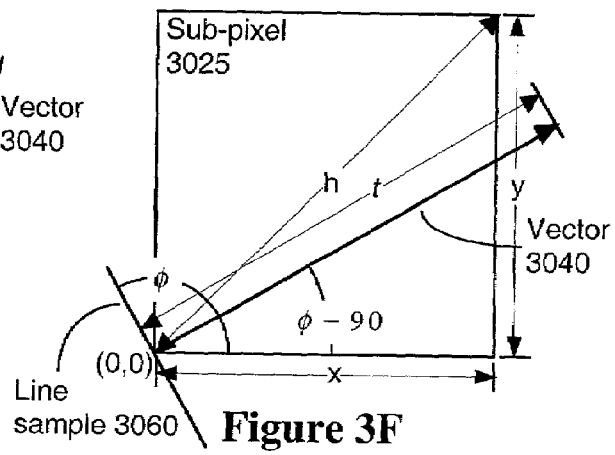
FIG. 3F illustrates an embodiment of the present invention in which an orientation and translation amount are selected in accordance with an embodiment of the present invention and a line sample is translated along a vector originating in the (0,0) translation origin.

Similarly, FIG. 3F shows line sample 3060 with an orientation of 110-degrees. Consistent with Table 1, line sample 3060 initially passes through the (0,0) translation origin. Consistent with the illustration of angles in FIG. 3F, the equation for determining the translation range t is as follows:

$$t = \sqrt{x^2 + y^2} \times \cos(\theta) \quad (4)$$

where θ=135°−φ

Figure 3G:
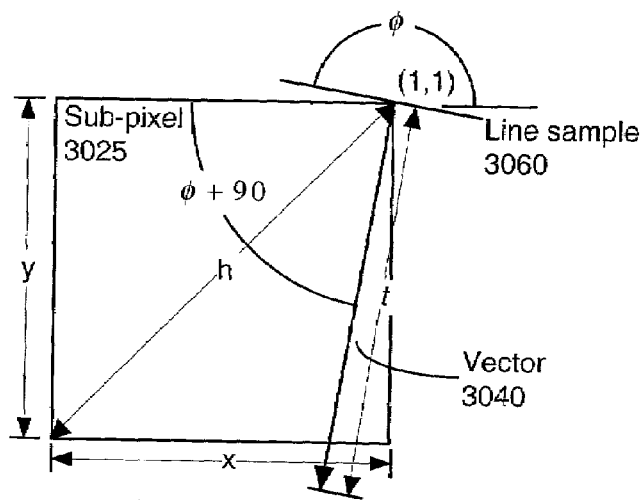
FIG. 3G illustrates an embodiment of the present invention in which an orientation and translation amount are selected in accordance with an embodiment of the present invention and a line sample is translated along a vector originating in the (1,1) translation origin.

Finally, FIG. 3G shows line sample 3060 with an orientation of 110-degrees. Consistent with Table 1, line sample 3060 initially passes through the (1,1) translation origin. FIG. 3G also shows line sample 3060 translated a translation range t. Consistent with the illustration of angles in FIG. 3G, the equation for determining the translation range t is as follows:

$$t = \sqrt{x^2 + y^2} \times \cos(\theta) \quad (5)$$

where θ=φ−135°

In another embodiment, renderer 23 selects an orientation and an area by reference to a non-regular sequence of numbers. Renderer 23 selects an orientation above a horizontal axis of sub-pixel 3025. Renderer 23 then selects an area formed by a line sample translated along a vector perpendicular to the line sample. Additionally, renderer 23 calculates a translation amount based on the selected area. Renderer 23 then translates line sample 3060 along vector 3040 by the calculated amount to a position within sub-pixel 3025. Renderer 23 preferably maintains the 135-degree orientation of line sample 3060 as it translates line sample 3060 along vector 3040.

Attention now turns to a more detailed description of this embodiment. In a first processing step, renderer 23 selects an orientation by reference to a non-regular sequence of numbers (step 4010, FIG. 4). Preferably, the sequence of numbers is a PRSN or a LDSN. Typically, each number in the sequence of numbers is a fractional number between zero and one. Renderer 23 multiplies this number by a range of numbers suitable for the task at hand. In this embodiment, the range of acceptable orientations is 0 to 180-degrees. Accordingly, renderer 23 selects an orientation by multiplying a number from the non-regular sequence of numbers by 180.

Figure 4A:
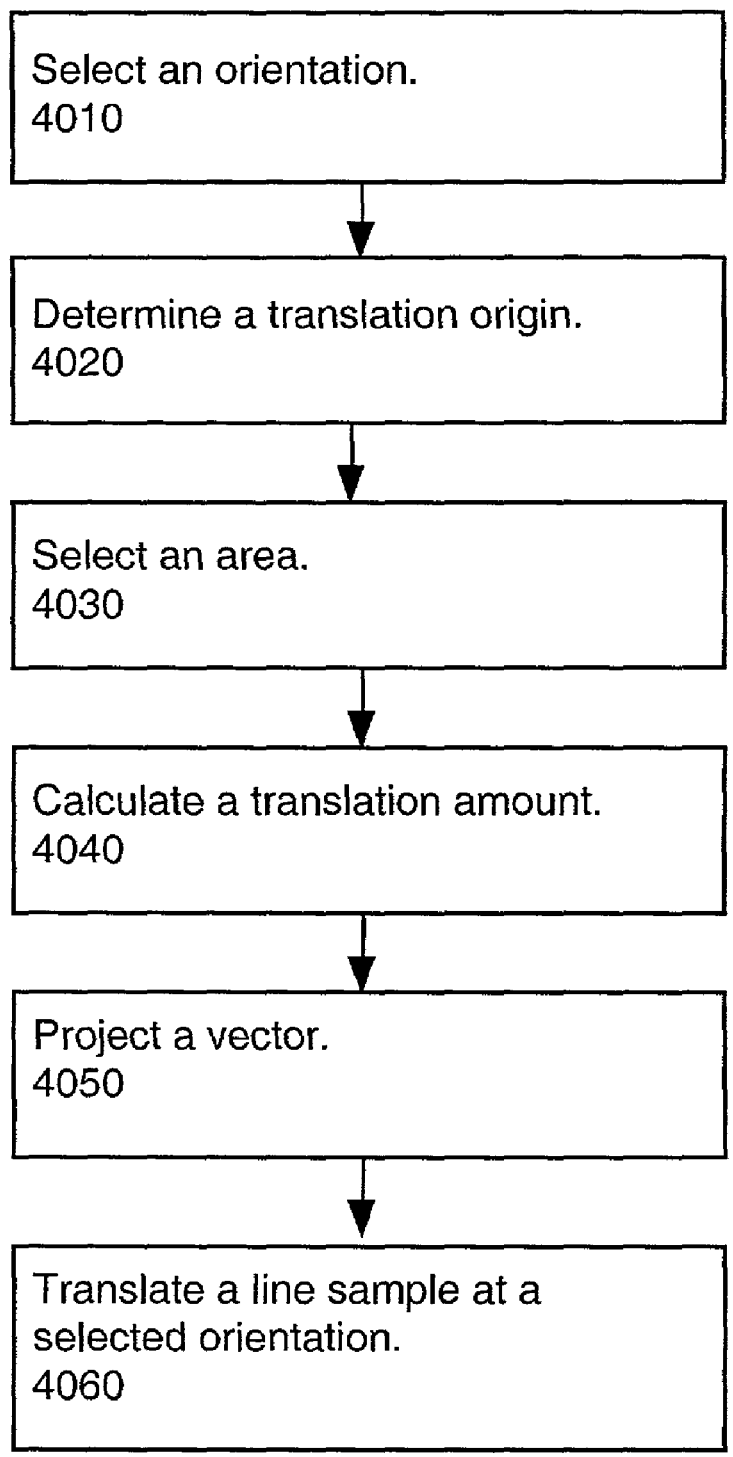
FIG. 4A illustrates processing steps in an embodiment of the present invention in which an orientation and an area are selected by reference to a non-regular sequence of numbers.
Figure 4B:
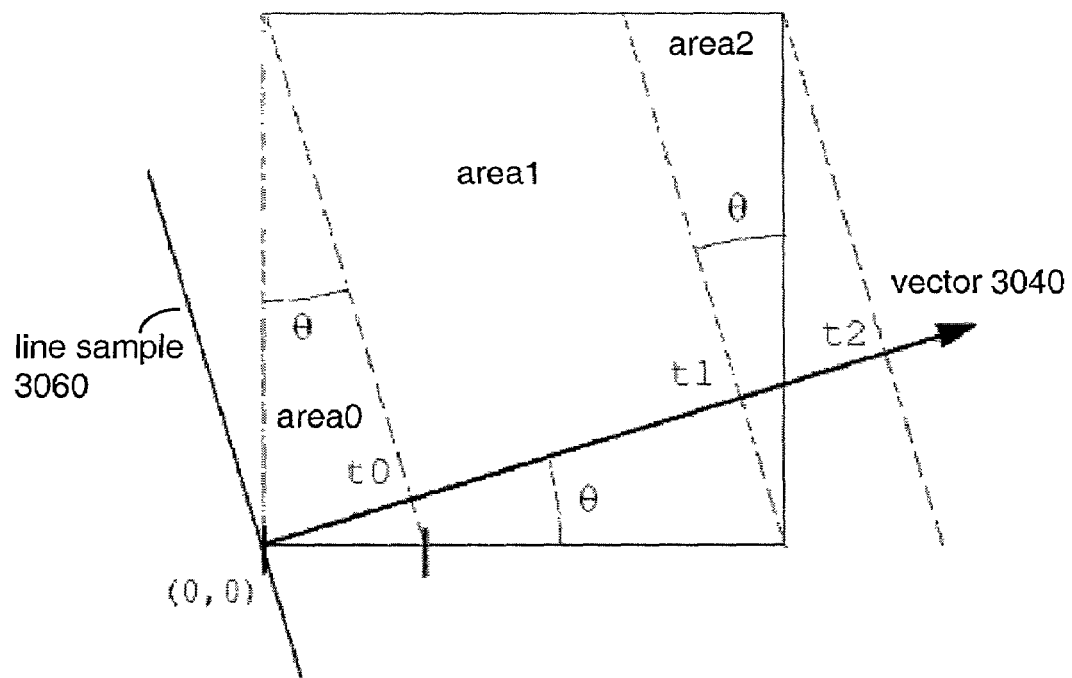
FIG. 4B illustrates a general case for a line sample orientation and area selection, including analytic regions used to derive a translation amount from a selected area, where the selected orientation is in a range of 90 and 135-degrees in a preferred embodiment of the invention.
Figure 4C:
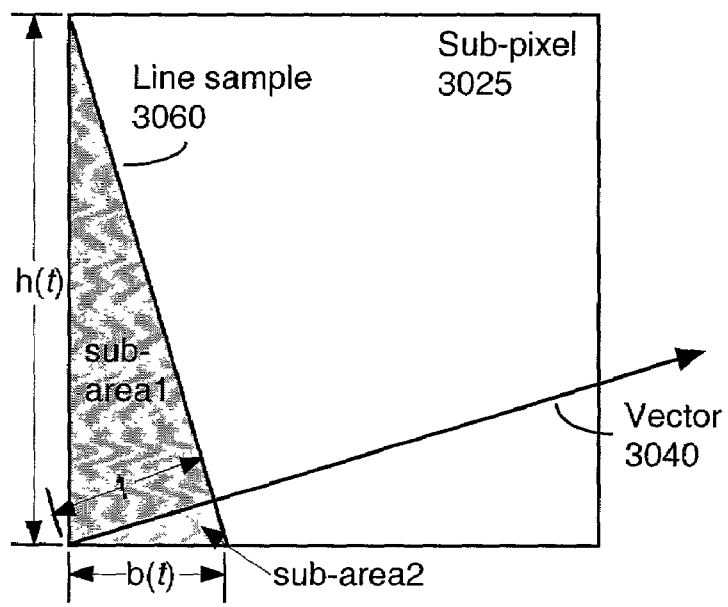
FIG. 4C illustrates regions of an area formed by a line sample and a sub-pixel that facilitate the derivation of an area-to-translation amount transformation in a preferred embodiment of the invention.
Figure 4D:
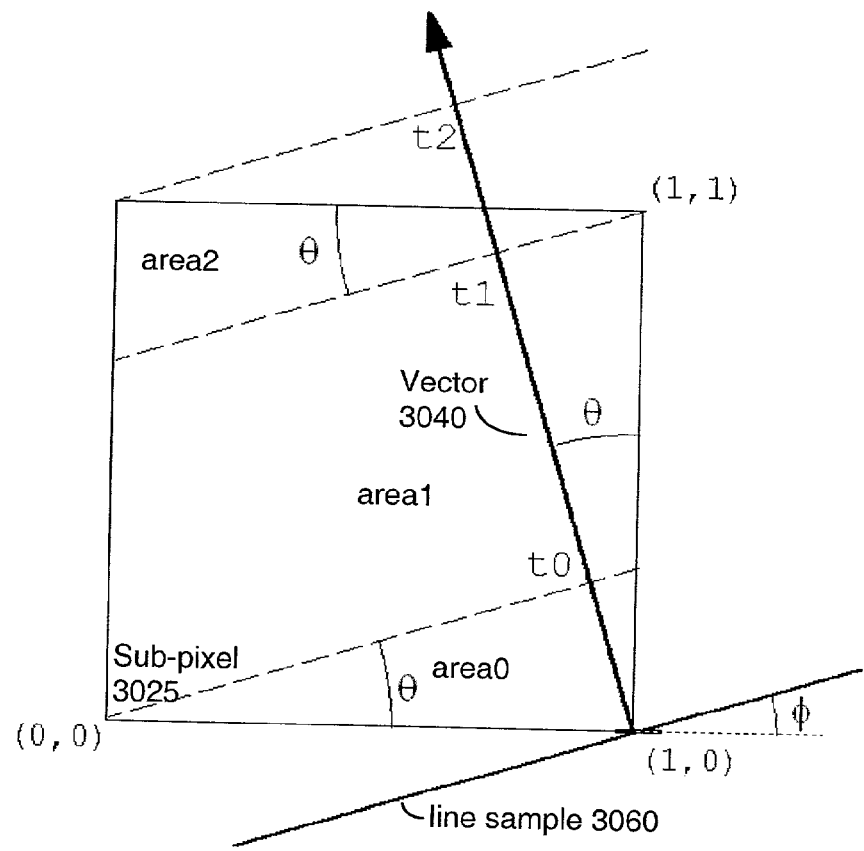
FIG. 4D illustrates a general case for a line sample orientation and area selection, including analytic regions used to derive a translation amount from a selected area, where the selected orientation is in a range of 0 and 45-degrees in a preferred embodiment of the invention.

In a next step, renderer 23 selects a translation origin of the sub-pixel (step 4020). The orientation selected in step 4010 determines the outcome of this step. For an orientation greater than or equal to 0-degrees and less than 45-degrees, renderer 23 selects translation origin (1,0). This means that renderer 23 translates line sample 3060 having an orientation within this range from a position beginning at translation origin (1,0) as illustrated in FIG. 4D. For an orientation greater than or equal to 45-degrees and less than 90-degrees, renderer 23 selects translation origin (0,1). For an orientation greater than or equal to 90-degrees and less than 135-degrees, renderer 23 selects translation origin (0,0). And for an orientation greater than or equal to 135-degrees and less than 180-degrees, renderer 23 selects translation origin (1,1). Thus, this embodiment of the invention adheres to the translation origin selection rules listed in Table 1.

Renderer 23 then selects an area by reference to a non-regular sequence of numbers (step 4030). Preferably, the sequence of numbers is a PRSN or a LDSN. Typically, each number in the sequence of numbers is a fractional number between zero and one. Renderer 23 multiplies this number by a range of numbers suitable for the task at hand. In this example, the area of a sub-pixel is one square unit. Accordingly, renderer 23 selects an area in this example by multiplying a number from the non-regular sequence of numbers by 1.

From the area selected in step 4030, renderer 23 calculates a translation amount (step 4040). To facilitate the calculation of a translation amount, renderer 23 subdivides sub-pixel 3025 to form the regions area0, area1, and area3, which are illustrated in FIG. 4B. In particular, FIG. 4B illustrates a general case for an orientation between 90 and 135-degrees above a horizontal axis of sub-pixel 3025. If $0 < t \leq t0$, line sample 3060 and sub-pixel 3025 form triangle area0. If $t0 < t \leq t1$, line sample 3060 and sub-pixel 3025 form parallelogram area1. And if $t1 < t \leq t2$, line sample 3060 and sub-pixel 3025 form triangle area2, which is equal in size to area0. The area of area0, area1, and area2, which FIG. 4B illustrates, is a function of t—the amount by which renderer 23 translates line sample 3060 along vector 3040. A function, area(t), that calculates the total area formed by line sample 3060 and sub-pixel 3025 is, therefore, the sum of three functions: area0(t), area1(t), and area2(t).

To develop function area(t), first consider area0(t) for $0 < t \leq t0$, wherein the intersection of line sample 3060 and sub-pixel 3025 form area0 as illustrated in FIG. 4B. The triangle is itself formed by two right triangles as illustrated by sub-area1 and sub-area2, the shaded regions of area0 in FIG. 4C. A portion of sub-pixel 3025, a portion of line sample 3060, and a portion of vector 3040 form sub-area1. The portion of vector 3040 that forms sub-area1 is equal in length to t. Further, the slope s of h(t) relative to line sample 3060 is equal to the rise over the run of h(t), i.e., t divided by the length of that portion of line sample 3060 that forms sub-area1. Using substitution, this portion of line sample 3060 is therefore equal in length to $$\frac{t}{s}.$$

Plugging this information into the Pythagorean Theorem solves for the length of h(t):

$$h(t)^2 = t^2 + \frac{t^2}{s^2} \Rightarrow h(t) = t\sqrt{1 + \frac{1}{s^2}} \qquad (6)$$

where s=cot(θ)

A portion of sub-pixel 3025, a portion of line sample 3060, and a portion of vector 3040 also form sub-area2. And as illustrated in FIG. 4C, the portion of vector 3040 that forms sub-area2 is also equal in length to t. Similarly, the slope s of b(t) is equal to the rise over the run of b(t), i.e., the length of the portion of line sample 3060 that forms sub-area2 divided by t. Using substitution, this portion of line sample 3060 is therefore equal in length to t×s. Plugging this information into the Pythagorean Theorem solves for the length of b(t):

$$b(t)^2 = t^2 + t^2 s^2 \Rightarrow b(t) = t\sqrt{1+s^2} \qquad (7)$$

where s=cot(θ)

Recall that line sample 3060, b(t), and h(t) form area0 (t). Plugging equations (6) and (7) into an equation solving for the area of a right triangle produces function area0 (t):

$$area0(t) = \frac{b(t)h(t)}{2} = \frac{1}{2}t^2\sqrt{2 + s^2 + \frac{1}{s^2}} = \frac{1}{2}t^2\left(s + \frac{1}{s}\right) \qquad (8)$$

As illustrated in FIG. 4C, h(t) is equal to the height of sub-pixel 3025 when t is equal to t0 since line sample 3060 passes through translation origin (0,1) at that t. Thus, the following equation solves for t at t0:

$$h(t) = t\sqrt{1 + \frac{1}{s^2}} \Rightarrow t = \frac{s}{\sqrt{1+s^2}} \qquad (9)$$

where t=t0

Further, plugging equation (9) into equation (8) solves area0 (t) at t0 as follows:

$$area0(t) = \frac{1}{2}\frac{s^2\left(s + \frac{1}{s}\right)}{(1+s^2)} = \frac{1}{2}\frac{s^2\left(s + \frac{1}{s}\right)}{s\left(s + \frac{1}{s}\right)} = \frac{s}{2} \qquad (10)$$

where t=t0

Additionally, b(t) is equal to the width of sub-pixel 3025 when t is equal to t1 since line sample 3060 passes through translation origin (1,0) at that t, as illustrated in FIG. 4C. Thus, the following equation solves t at t1:

$$b(t) = t\sqrt{1+s^2} \Rightarrow t = \frac{1}{\sqrt{1+s^2}} \qquad (11)$$

where t=t1

And because of the similarity between area0 and area2:

$$t2 - t1 = t0 \Rightarrow t2 = t0 + t1 = \frac{s+1}{\sqrt{1+s^2}} \qquad (12)$$

Thus, $$area2(t) = area0 - area0(t2-t) \qquad (13)$$

where t>t1

Using equation (8), equation (13) is rewritten as follows:

$$area2(t) = area0 - \frac{1}{2}(t2-t)^2\left(s + \frac{1}{2}\right) \qquad (14)$$

where t>t1

Further, the area1(t) is swept out linearly as t increases from t0 to t1. Area1(t) is therefore solved as follows:

$$area1(t) = \frac{t-t0}{t1-t0}(1 - 2area0) \qquad (15)$$

where $$t > t0$$

$$\frac{t-t0}{t1-t0}$$

is the percentage of area1 swept out by line sample 3060, and (1−2area0) is the area of area1 in terms of area0.

Using equation (10), equation (15) is rewritten as follows:

$$area1(t) = \frac{t-t0}{t1-t0}(1 - s) \qquad (16)$$

where $$t > t0$$

$$\frac{t-t0}{t1-t0}$$

is the percentage of area1 swept out by line sample 3060, and (1−s) is the area of area1 in terms of s.

Thus function area(t) is written as follows:

$$area(t) = \begin{cases} \frac{1}{2}t^2\left(s + \frac{1}{s}\right) & 0 \leq t < t0 \\ \frac{s}{2} + \frac{t-t0}{t1-t0}(1-s), & t0 \leq t \leq t1 \\ 1 - \frac{1}{2}(t2-t)^2\left(s + \frac{1}{s}\right), & t1 < t < t2 \end{cases} \quad (17)$$

Inverting area(t) gives:

$$t(A) = \begin{cases} \frac{\sqrt{2sA}}{\sqrt{1+s^2}}, & 0 \leq A < \frac{s}{2} \\ \frac{\left(A + \frac{s}{2}\right)}{\sqrt{1+s^2}}, & \frac{s}{2} \leq A \leq 1 - \frac{s}{2} \\ \frac{s+1-\sqrt{2s(1-A)}}{\sqrt{1+s^2}}, & 1 - \frac{s}{2} < A < 1 \end{cases} \quad (18)$$

where
A is an area selected in step 4030,
φ is the orientation selected in step 4010, and
s=cot(θ)
θ=φ−90°

Thus, renderer 23 plugs the area selected in step 4030 into equation 18 to calculate a translation amount. Other techniques for deriving a translation amount are of course possible and within the scope of the present invention.

Having found t(A) (i.e., equation 18) for orientations between 90 and 135-degrees above a horizontal axis of sub-pixel 3025, renderer 23 exploits symmetries to solve for orientations between 0 and 45-degrees, 45 and 90-degrees, and 135 and 180-degrees. Renderer 23 can thus use t(A) to compute translation range t for line sample 3060 regardless of its orientation. Renderer 23 need only change the initial translation point for line sample 3060 and θ.

Consider line sample 3060 with an orientation, φ, between 0 and 45-degrees above a horizontal axis of sub-pixel 3025, as illustrated in FIG. 4D. In effect, FIG. 4B is rotated counter-clockwise by 90-degrees. Note, however, that θ now equals φ. Otherwise, t(A) is the same for this range of orientations.

Figure 4E:
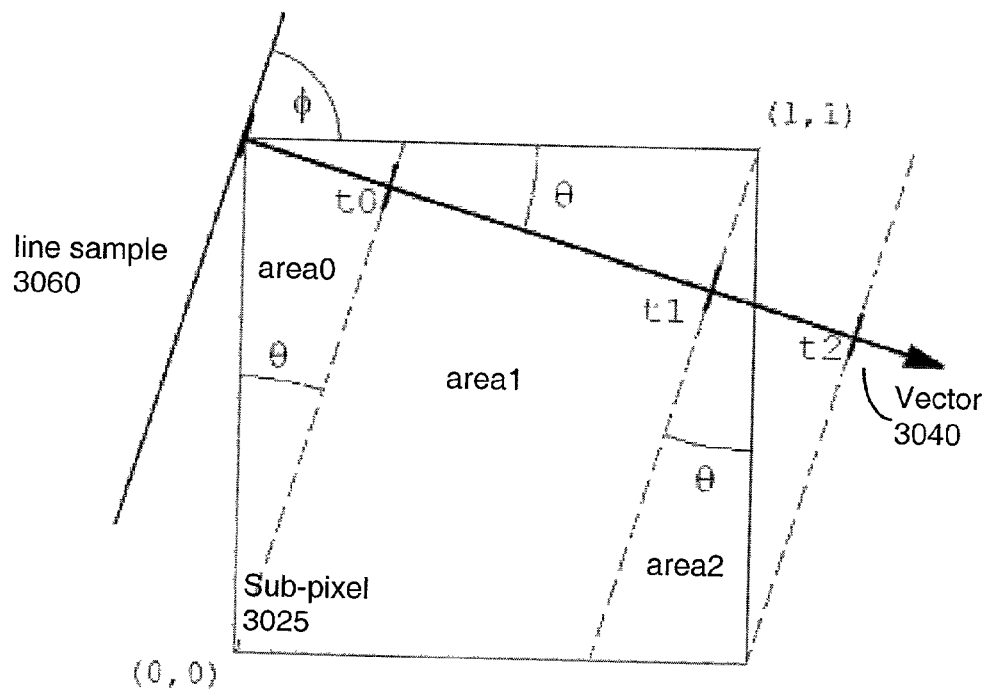
FIG. 4E illustrates a general case for a line sample orientation and area selection, including analytic regions used to derive a translation amount from a selected area, where the selected orientation is in a range of 45 and 90-degrees in a preferred embodiment of the invention.

Similarly, renderer 23 may translate line sample 3060 with an orientation between 45 and 90-degrees from (0,1) by t(A) as illustrated in FIG. 4E—effectively flipping FIG. 4B about the horizontal axis. In this case, θ equals 90°−φ. Otherwise, t(A) is the same for this range of orientations as well.

Figure 4F:
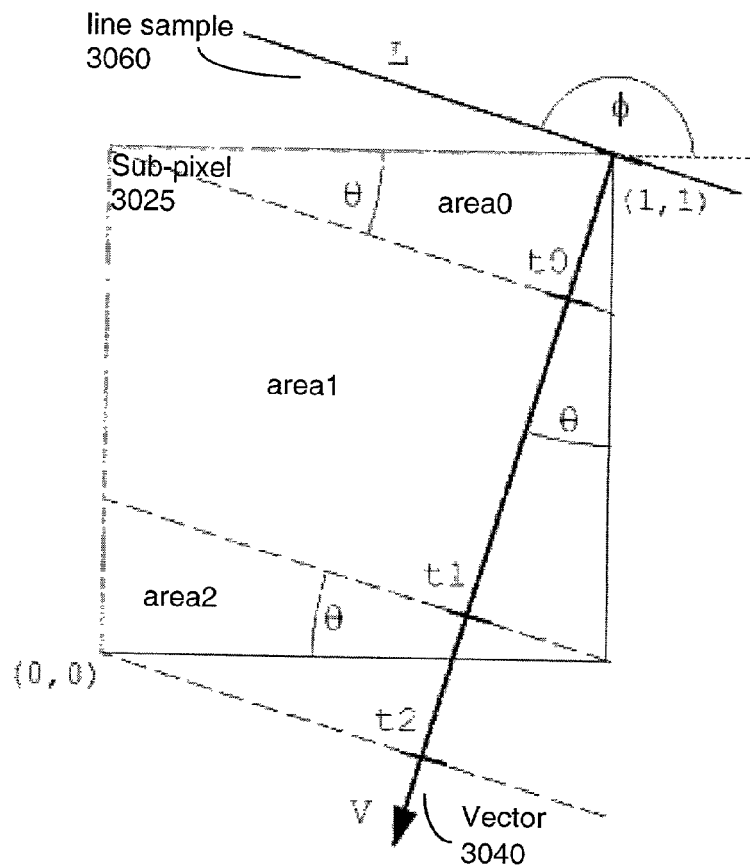
FIG. 4F illustrates a general case for a line sample orientation and area selection, including analytic regions used to derive a translation amount from a selected area, where the selected orientation is in a range of 135 and 180-degrees in a preferred embodiment of the invention.

Further, renderer 23 may translate line sample 3060 with an orientation between 135 and 180-degrees from (1,1) as illustrated in FIG. 4F—effectively flipping and rotating FIG. 4B. In this case, θ equals 180°−φ. Otherwise, t(A) is the same for this range of orientations as well. Table 1 is therefore extended to produce Table 2 as follows:

TABLE 2

| Orientation (φ) | θ | Translation Origin |
|---|---|---|
| 0° ≦ φ < 45° | φ | (1, 0) |
| 45° ≦ φ < 90° | 90 − φ | (0, 1) |
| 90° ≦ φ < 135° | φ + 90 | (0, 0) |
| 135° ≦ φ < 180° | 180 − φ | (1, 1) |

In a next step, renderer 23 projects vector 3040 into sub-pixel 3025 from translation origin (1,0) in a direction perpendicular to line sample 3060 (step 4050).

Renderer 23 then translates line sample 3060 along vector 3040 by an amount determined in step 4040 (step 4060). Preferably, renderer 23 does not alter the orientation of line sample 3060 during the translation process. Additionally, renderer 23 preferably extends line sample 3060 to the borders of sub-pixel 3025.

Figure 4G:
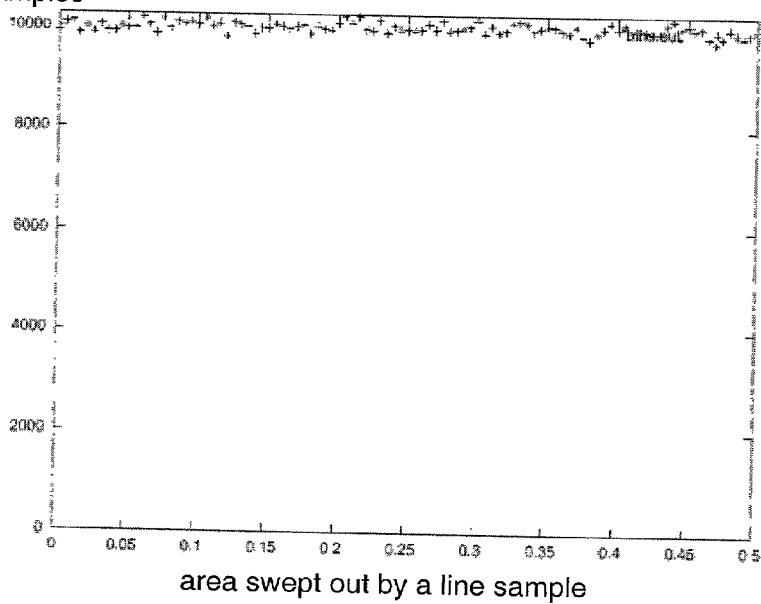
FIG. 4G illustrates pixel area sampling rates resulting from an embodiment of the present invention.

Using the above derived equations, renderer 23 uniformly samples the area of sub-pixel 3025. FIG. 4G illustrates the effectiveness of the above derived equations. 1,000,000 line samples were positioned by a randomly selected orientation and area using the above-described techniques. FIG. 4G evidences the uniformity with which renderer 23 samples the area of sub-pixels in this embodiment of the invention. Specifically, in this embodiment of the present invention, the number of line samples with a given area is consistent across a range of areas.

In still another embodiment of the invention, renderer 23 employs a type of stratified sampling to ensure uniform sampling. Renderer 23 subdivides a two-dimensional domain of orientation and translation to produce a number of sub-domains reflecting the number of sub-pixels in each pixel. Each sub-domain represents an orientation range and a translation range defined by the size of the sub-domain relative to the two-dimensional domain of orientation and translation and the position of sub-domain within the two-dimensional domain of orientation and translation. Thus, each sub-domain has a unique set of possible orientation and translation pairs.

From each sub-domain, renderer 23 selects an orientation and translation pair. And because each orientation and translation pair is selected from a separate sub-domain, renderer 23 does not select a set of clustered orientation and translation pairs. This step ultimately results in line samples with a more uniform distribution of orientations and translation amounts. Renderer 23 then assigns the orientation and translation pair to a sub-pixel by reference to a non-regular sequence of numbers (e.g., PRSN, LDSN). The use of a non-regular sequence of numbers prevents the assignment of an orientation and translation pair with a limited range to the same sub-pixel repeatedly. Renderer 23 then positions line samples by reference to the orientation and translation pair.

Attention now turns to a more detailed description of this embodiment. In a first processing step, renderer 23 subdivides a two-dimensional domain of orientation and translation to produce a number of sub-domains (step 5010, FIG. 5A). The two-dimensional domain of orientation and translation preferably includes a number of sub-domains that is equal to the number of sub-pixels or included in each pixel. Each of the sub-domains eventually produces a position for a line sample in each sub-pixel. FIG. 5B illustrates an example of a two-dimensional domain of orientation and translation 5000 in accordance with this embodiment of the invention. Note that the axes of the two-dimensional domain of orientation and translation 5000 range from zero to one. Thus, in the particular example, the selected orientation and translation range is actually a percentage amount. As described below, renderer 23 eventually multiplies the orientation and translation pairs against maximum orientation and translation amounts.

In the next processing step, renderer 23 selects an orientation and translation pair having a range dictated by the size and positioning of a sub-domain (step 5020). In the two-dimensional domain of orientation and translation 5000 of FIG. 5B, each sub-domain has a specified size. For example, sub-domain 1 has a range of 0.5 to 1.0 along the orientation axis and a range of 0.0 to 0.5 along the translation. Accordingly, an orientation and translation pair selected from sub-domain 1 will be limited to a range of 0.5 to 1.0 or 0.0 to 0.5. For either range, the difference between the upper and lower range is 0.5. Accordingly, renderer 23 selects the pair of numbers by multiplying this difference by a number from a non-regular sequence of numbers. The result of this step is added to the lower range along the translation and the orientation axises.

The following steps illustrate the procedure for selecting an orientation and translation pair for sub-domain 1 in accordance with a preferred embodiment of the present invention:

Translation axis:

$$0.5*0.345=0.173$$

$$0.0+0.173=0.173$$

where 0.5 is the orientation range of the sub-domain where 0.345 is a number from a non-regular sequence of numbers where 0.173 is the x coordinate Orientation axis:

$$0.5*0.856=0.428$$

$$0.428+0.5=0.928$$

where 0.5 is the orientation range of the sub-domain where 0.856 is a number from a non-regular sequence of numbers where 0.928 is the y coordinate Renderer 23 preferably repeats step 5020 for each sub-domain in the two-dimensional domain of orientation and translation as illustrated in FIG. 5B. In FIG. 5B, the points are positioned according to an orientation and translation pair.

In a next processing step, renderer 23 assigns the orientation and translation pairs selected in step 5020 to a sub-domain (step 5030). As noted above, the dimensions and location of a sub-domain limit an orientation and translation pair selected therefrom. Thus, an orientation and translation pair from sub-domain 1 will never have an x coordinate greater than 0.5. Similarly, the y coordinate will never be less than 0.5. However, renderer 23 uses the orientation and translation pairs to select an orientation and a translation amount for a line sample. Specifically, renderer 23 multiplies a number from the orientation and translation pair against a range of possible orientations for a line sample (i.e., 0 to 180-degrees). Because, for example, the translation value is never less than 0.5, an orientation selected by this value is never less than 90-degrees. Aliasing can therefore result if renderer 23 repeatedly assigns the orientation and translation pair from sub-domain 1 to the same sub-pixel.

To avoid this problem, renderer 23 assigns the orientation and translation pairs to a sub-pixel by reference to a non-regular sequence of numbers. This step minimizes aliasing by preventing the same sub-pixel from having the same orientation range each time renderer 23 positions a line sample within the sub-pixel.

Renderer 23 preferably accomplishes this by repeating the following sequences of steps for each sub-pixel in a pixel:
  select a number from a sequence of non-regular numbers; where the number is between 0 and 1;
  multiply the number from the sequence of non-regular numbers by the number of sub-pixels included in a pixel;
  extract an integer value from the result of the multiplying step;
    where renderer 23 extracts the number by, for example, rounding or truncating; and
  assign an orientation and translation pair to a sub-pixel by reference to the result of the extracting step.

FIG. 5C illustrates the assignment of orientation and translation pairs to sub-pixels in pixel 5010. The orientation and translation pair from sub-domain 0 is assigned to sub-pixel 3, the orientation and translation pair from sub-domain 1 is assigned to sub-pixel 0, the orientation and translation pair from sub-domain 2 is assigned to sub-pixel 1, and the orientation and translation pair from sub-domain 3 is assigned to sub-pixel 2.

Once assigned to a sub-pixel, renderer 23 uses an orientation and translation pair to position a line sample within the sub-pixel (step 5040). Preferably, renderer 23 uses a line sample positioning technique described above to position the line sample, but other techniques are within the scope of the present invention.

Note that in alternative embodiments of the invention, the number of sub-domains is not equal to the number of sub-pixels included in each pixel. Instead, the number of sub-domains is equal to the number of line samples included in some other defined region of the image plane. For example, the number of sub-domains is equal to the number of line samples distributed within a set of pixels or the entire image plane. Additionally, in some embodiments of the invention, line samples are not restricted to separate regions of the image plane (e.g., sub-pixels). In these embodiments, orientation and translation pairs are assigned to line samples instead of sub-pixels as described above.

In still another embodiment of the invention, renderer 23 takes additional steps to assure a uniform distribution of line samples by employing best candidate techniques. Renderer 23 positions a line sample within a first sub-pixel by reference to a non-regular sequence of numbers. Renderer 23 then positions a set of line samples within a neighboring or adjacent sub-pixel by reference to a non-regular sequence of numbers. Renderer 23 then scores each line sample in the set of line samples by reference to the line sample positioned in the first sub-pixel. While the precise scoring technique can vary without departing from the scope of the invention, the scoring preferably ensures that neighboring or adjacent line samples are not too close together or too similarly oriented.

Renderer 23 then selects the line sample with the best score from the set of line samples and repeats this step for each sub-pixel. However, renderer 23 extends this scoring process to include each line sample selected from a group of sub-pixels, which may or may not extend beyond the border of a pixel. Thus, for a third line sample, the scoring process favors an orientation that is most different from the orientation of the first and second line sample and most distant from the first and second line sample.

Figure 6A:
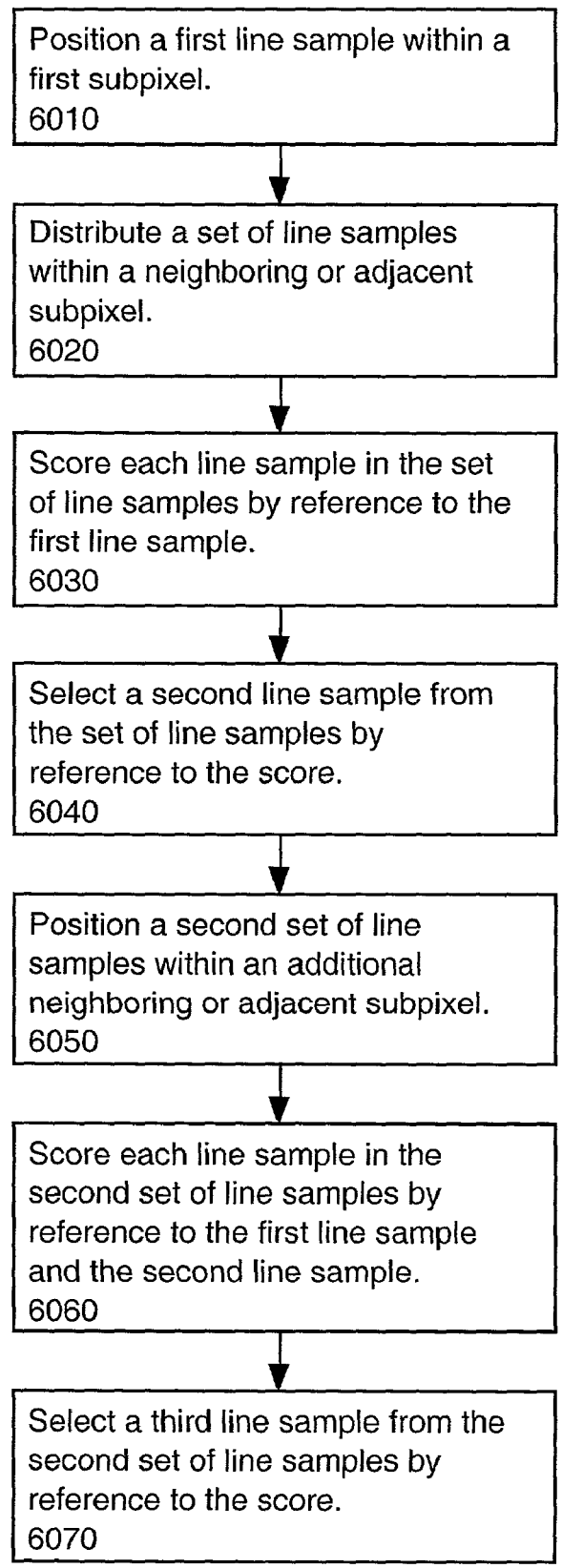
FIG. 6A illustrates processing steps that ensure a best candidate selection from a set of line samples in an embodiment of the invention.

Attention now turns to a more detailed description of this embodiment. In a first processing step, renderer 23 positions a first line sample within a sub-pixel (step 6010, FIG. 6A). The precise technique used to position the line sample is variable without departing from the scope of the invention.

Figure 6B:
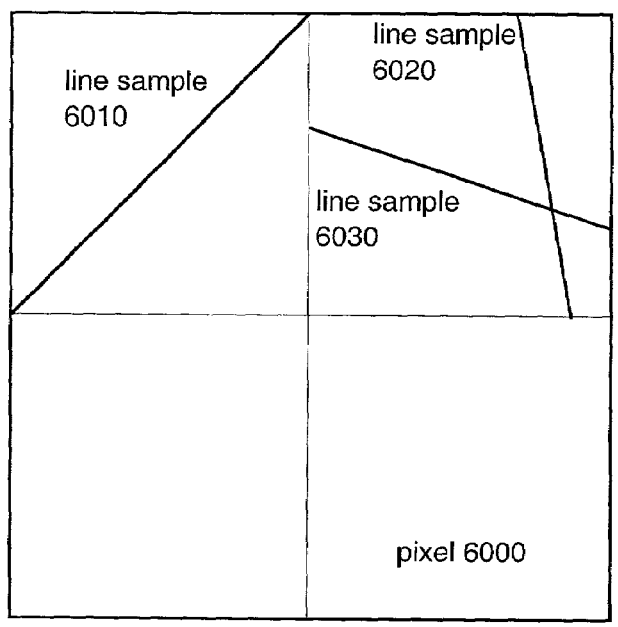
FIG. 6B illustrates a selected line sample and a distributed set of line samples in adjacent sub-pixels in an embodiment of the invention.

However, renderer 23 selects an orientation and translation amount by reference to a non-regular sequence of numbers. FIG. 6B illustrates pixel 6000 subdivided to form four sub-pixels. Included in the upper, left sub-pixel is line sample 6010, selected in accordance with step 6010.

Renderer 23 then positions a set of line samples within a neighboring or adjacent sub-pixel (step 6020). A number of positioning techniques are possible without departing from the scope of the invention. For example, some embodiments of the invention use the stratified line sampling method described above. Instead of distributing the orientation and translation pairs to an equal number of sub-pixels as described above, however, renderer 23 uses all of the orientation and translation pairs to position the set of line samples in a single sub-pixel. Incorporating stratified line sampling in this manner eliminates the possibility of a clustered set of line samples. Also included in FIG. 6B is a set of line samples, consisting of line sample 6020 and line sample 6030 distributed in the upper, right sub-pixel of pixel 6000. In this example, the set of line samples comprises two line samples, but the invention is not so limited. The inclusion of more line samples will typically result in a more uniform distribution of line samples by broadening the selection of line samples.

Renderer 23 then scores each line sample in the set of line samples by reference to the first line sample positioned in step 6010 (step 6030). Again, the precise scoring technique can vary without departing from the scope of the invention, but the scoring preferably ensures that neighboring or adjacent line samples are not too close together or too similarly oriented. In a preferred embodiment, the scoring process includes comparing the orientation of the first line sample to the orientation of a line sample from the set of line samples.

If the first line sample is not perpendicular to the line sample from the set of line samples, there are necessarily two different angles between the two line samples. To determine the minimum angle of the two different angles, renderer 23 determines the difference between the selected orientation. If the result of this step is greater than 90-degrees, this result is the maximum angle between the two line samples. Renderer 23 subtracts 90-degrees from the maximum angle to get the minimum angle between the two orientations.

Figure 6C:
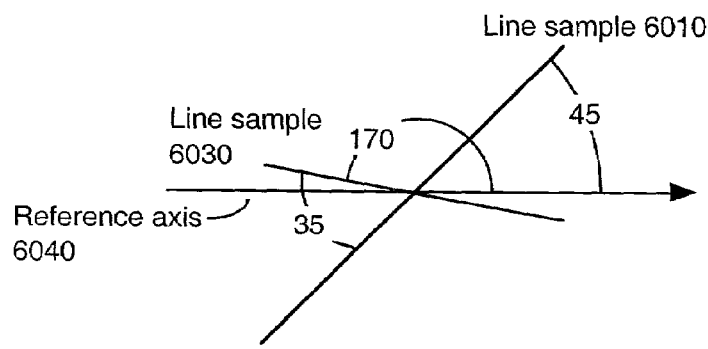
FIG. 6C illustrates a line sample orientation comparison.

To illustrate the comparison, FIG. 6C shows a first selected line sample, line sample 6010, superimposed over a line sample, line sample 6030, from a set of line samples distributed in an adjacent sub-pixel. The selected orientation of line sample 6010 and line sample 6030 sweeps each line sample away from reference axis 6040. As illustrated in FIG. 6C, the orientation of line sample 6010 is 45-degrees and the orientation of line sample 6030 is 170-degrees from reference axis 6040. The difference between these two orientations is 125-degrees. Because the difference is greater than 90-degrees, renderer 23 subtracts 90-degrees from this amount to arrive at 35-degrees, the minimum angle between line sample 6010 and line sample 6030.

Figure 6D:
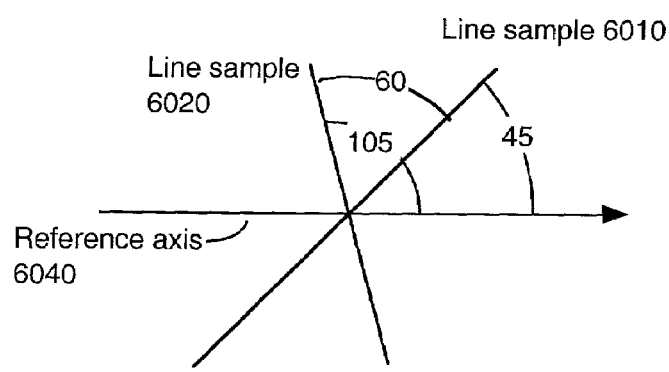
FIG. 6D illustrates a line sample orientation comparison.

In another illustration, FIG. 6D shows line sample 6010 superimposed over line sample 6020, another line sample from the set of line sample distributed in an adjacent sub-pixel. As illustrated in FIG. 6D, the orientation of line sample 6010 is 45-degrees and the orientation of line sample 6020 is 105-degrees from reference axis 6040. The difference between these two orientations is 60-degrees. 60-degrees is the minimum angle between line sample 6010 and line sample 6020 because it is less than or equal to 90-degrees.

In addition to comparing orientations, a preferred embodiment also includes a comparison of the distance between the first line sample and a line sample from the set of line samples. There are a number of techniques available for comparing the distance between two line samples without departing from the scope of the invention. In a preferred embodiment, renderer 23 determines the closest approach between the two line samples at any point along each line. In other embodiments, renderer 23 determines the closest approach by reference to a midway point along each line sample.

Preferably, renderer 23 normalizes both the closest approach and minimum angle to equalize the contribution of each to the overall score. Renderer 23 preferably divides the minimum angle by 90-degrees to obtain a value between zero and one since the minimum angle is between 0 and 90-degrees. Additionally, renderer 23 preferably divides the closest approach by the maximum distance between any two points in the relevant sub-pixels.

Renderer 23 then combines the minimum angle and closest approach by, for example, multiplying the two values. In other embodiments, renderer 23 adjusts one or both of the values so that one of the values is a more significant factor in the scoring process.

The following equation illustrates the scoring techniques described above:

$$\text{score} = a\left(\frac{angle_m}{90}\right) + b\left(\frac{dist}{\max dist}\right) \qquad (19)$$

where
  $angle_m$ is the minimum angle between the first line sample and a second line sample;
  dist is the distance between the first line sample and a second line sample;
  max dist is the maximum possible distance between the first line sample and a second line sample;
  a is a factor that adjusts the contribution of the minimum angle to the score; and
  b is a factor that adjusts the contribution of the distance to the score.

After scoring one or more line samples from the set of line samples distributed in step 6020, renderer 23 selects a line sample (step 6040). Because the preferred embodiments of the invention seek to maximize the distance and angle between line samples, renderer 23 selects the line sample with the highest score. But some embodiments do not require this since these embodiments emphasize different attributes in a distribution of line samples.

Depending on the needs of a particular embodiment of the invention, renderer 23 distributes a set of line samples within another sub-pixel (step 6050). As with the positioning of line samples in step 6020, renderer 23 preferably positions the line samples by applying the line sample positioning techniques described above.

Renderer 23 then scores each line sample in this set of line samples by reference to the first and second line samples positioned and selected in steps 6010 and 6040 respectively (step 6060). The scoring process is essentially the same as that described with reference to step 6030. However, combining the individual scores to determine an overall score is subject to a great deal of variation. Again, the general goal is to select a line sample having a maximum distance and orientation from the first and second line samples. An example of a variation is giving more weight to line samples positioned within sub-pixels that are closest to the sub-pixel containing the line sample being scored. Additionally, renderer 23 may assign relatively more weight to sub-pixels that share a pixel. The scoring process in preferred embodiments of the present invention thus includes line samples distributed within neighboring or adjacent pixels even though FIG. 6B illustrates only a single pixel. As described in greater detail below, renderer 23 preferably determines a color value for a pixel by combining color values for a plurality of line samples. The number of line samples used is variable. For example, some embodiments combine line samples from neighboring pixels to compute a color value for a given pixel. In these embodiments, renderer 23 preferably extends the scoring process to include all line samples included in the given pixel and its neighboring pixels. Other variations are possible without departing from the scope of the invention.

Accordingly, equation (19) is extended as follows:

$$\text{score} = c_1 \left[ a\left(\frac{angle_m}{90}\right) + b\left(\frac{dist}{\max\,dist}\right) \right]_1 + \qquad (20)$$
$$c_2 \left[ a\left(\frac{angle_m}{90}\right) + b\left(\frac{dist}{\max\,dist}\right) \right]_2 + \ldots +$$
$$c_n \left[ a\left(\frac{angle_m}{90}\right) + b\left(\frac{dist}{\max\,dist}\right) \right]_n$$

where c is a weight attributed to each line sample's contribution to the overall score;

n is the number of line samples against which renderer 23 scores a candidate line sample.

Weight c is, depending on the embodiment, a reflection of the distance between a candidate line sample and an already-selected line sample, a reflection of whether the candidate line sample and an already-selected line sample are within the same pixel, or both.

After scoring one or more line samples from the set of line samples distributed in step 6050, renderer 23 selects a line sample (step 6070). Because preferred embodiments of the invention seek to maximize the distance and angle between line samples, renderer 23 selects the line sample with the best score. But some embodiments do not require this since they emphasize different attributes in a distribution of line samples.

In the above-described embodiment, each line sample is selected separately, in a linear fashion. That is, renderer 23 positions a first line sample, and selects a second line sample from a set of line samples by reference to the first line sample. Renderer 23 then selects a third line sample by reference to the first and second line samples. Renderer 23 extends this process as needed.

However, in alternative embodiments, sets of line samples are selected together, rather than individually. In these embodiments, renderer 23 distributes a set of line samples in a region (e.g., a set of pixels) of image plane 110. Renderer 23 then selects a subset of the set of line samples. For example, renderer 23 selects one line sample from each sub-region (e.g., a sub-pixel). Renderer 23 then scores the sub-set of line samples. The scoring process is similar to the scoring process described above. Essentially, the score reflects an average minimum angle and distance between each line sample in the subset of line samples. Renderer 23 then selects and scores a second subset of line samples from the set of line samples. Renderer 23 continues the selecting and scoring subsets until a suitable number of subsets are selected and scored. Renderer 23 then uses the subset having the best score. Note that various techniques are available to improve the efficiency of these embodiments. In particular, a great deal of work has been done on so-called "traveling salesman" problems, which involve computing a route between a set of cities. Typically, the work involves the application of heuristics. The problem of selecting line sample positions is stated such that the minimum angle and distance between two line samples is thought of as the cost of traveling between to cities. This embodiment of the invention is, therefore, preferably optimized with simulated annealing, which has known application to the traveling salesman problem.

In still another embodiment of the present invention, renderer 23 distributes line samples in time. As noted above, object scene data 21 maintains information about the movement of objects during a time period associated with an image frame. To simulate motion blur, renderer 23 selects a specific period of time for each line sample. More specifically, renderer 23 multiplies the period of time associated with the image frame by a number from a non-regular sequence of numbers. Each of the numbers in the non-regular sequence of numbers is between zero and one so the result of the multiplication is a fraction of the time period. Memory 20 maintains the selected time period for each line sample along with other information in association with each line sample. Note that in preferred embodiments, renderer 23 takes additional steps to assure a uniform distribution of selected times. Accordingly, renderer 23 takes steps analogous to those taken and described above when selecting a position for a line sample when selecting a time for the line sample.

After a set of line samples is distributed using an above-described or other embodiment of the present invention, renderer 23 projects objects from an object scene onto image plane 110 as illustrated in FIG. 1B (step 1030, FIG. 1C). As a preliminary step, renderer 23 determines whether an object is within a region that includes a line sample being processed.

Renderer 23 preferably encloses a candidate object in a bounding box before making this determination. Renderer 23 accesses object scene data 21 to determine the size and position of the object being processed.

The bounding box loosely follows the contours of the object. It is generally easier to determine whether the object is within a region of a line sample through the use of a bounding box because the bounding box lacks shape or surface complexity possessed by some objects. Typically, the region of a line sample includes the area that the pixel or sub-pixel containing the line sample overlaps. If the bounding box is not within a region of the line sample, renderer 23 processes a different candidate object.

As noted above, renderer 23 preferably distributes line samples in a period of time associated with an image frame. Accordingly, the movement of an object during this period of time complicates the step of determining whether a line sample, sub-pixel, or pixel overlaps an object. To address this movement, the bounding box actually stretches to enclose the object during its movement within the period of time associated with the image frame.

If the bounding box is within a region of the line sample, renderer 23 may convert the object to a grid of micropolygons. A grid of micropolygons is often easier to project onto image plane 110 and sample with line samples (as described below) than objects with complex surfaces (e.g., smoothly varying surfaces). Additionally, it is computationally less complex to enclose a grid of micropolygons tightly within a bounding box. In other words, renderer 23 is able to determine more precisely if a region around a line sample overlaps the object. Thus, renderer 23 may also take the step of enclosing the grid of micropolygons within a bounding box. Again, if the bounding box is not within a region of the line sample, renderer 23 processes a different candidate object.

Renderer 23 then transforms the object (possibly in the form of a grid of micropolygons) to the precise time of a line sample. Additionally, renderer 23 selects a lens position for the line sample being processed. Renderer 23 then transforms the object according to the lens position assigned to that line sample.

Figure 7:
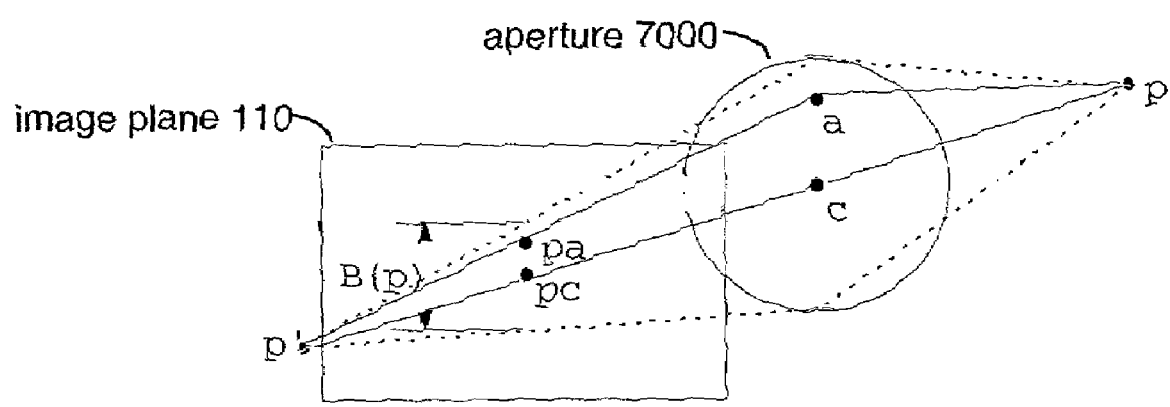
FIG. 7 illustrates the simulation of depth of field in a preferred embodiment of the present invention.

As noted above, renderer 23 simulates limited depth of field. To do so, renderer 23 associates a point a on aperture 7000 with each line sample on image plane 110 as illustrated in FIG. 7 (line sample not illustrated). Renderer 23 may choose the points using a regular pattern, through a stochastic process, or by way of stratification. Because a is a single point on the aperture, the image it forms on image plane 110 is a 'pinhole' image that renderer 23 computes using standard projection techniques.

Renderer 23 projects an object onto image plane 110 once through c, and then translates the object for each line sample that overlaps the object. Renderer 23 translates the object by (pc−pa), where pc is the position of the object on image plane 110 if projected through c and pa is the position of the object on image plane 110 if projected through a.

To compute (pc−pa), renderer 23 makes use of a function B(p), which defines a scaling factor of the circle of confusion (i.e., the area of image plane 110 into which renderer 23 projects p) associated with the point p relative to aperture 7000. Thus, (pc−pa) equal (a-c)*B(p).

In a traditional camera model, the camera is parameterized by its focal length, f, an aperture number, n, and a distance from the aperture at which the camera is focused, D. If the camera of the axis is aligned with the z axis, renderer 23 computes the circle of confusion for a traditional camera model as $$C(p) = \frac{f}{n}\left(1 - \frac{Z}{p'_z}\right), \text{ where } Z = \frac{fD}{D-f}$$

is the distance from the aperture to image of the plane of focus, and $$p'_z = \frac{fp_z}{p_z - f}$$

is the distance along the camera axis from the aperture to p', the image of p. Because f/n defines the diameter of the aperture, for a traditional camera system renderer 23 might write the blur scaling function as $$B(p) = \left(1 - \frac{Z}{p'_z}\right) = \frac{D}{p_z} \frac{p_z - f}{D-f}.$$

The present invention is not, however, limited to traditional camera models. Instead, the present invention uses any smoothly-varying function of p to, for example, have multiple planes of focus.

Renderer 23 furthermore defines a function Fq(l,p) to 'filter' a value of a quantity (e.g. color) associated with a point or object p when p is viewed through point l on the aperture. Example uses of F include modifying the shape of the circle of confusion or changing the brightness of the circle of confusion as a function of aperture or object position, and so on.

After renderer 23 projects the object onto image plane 110, renderer 23 computes the view of an object scene along the line sample being processed (step 1040). Since a line sample can overlap multiple objects, renderer 23 must determine and mark each segment of the line sample that overlaps a portion of an object. Renderer 23 then stores this information in memory 20 in association with the line sample. Renderer 23 repeats this step for each object projected on to image plane 110. Additionally, renderer 23 determines which of the objects overlapped by the line sample being processed are closest to image plane 110.

Figure 8A:
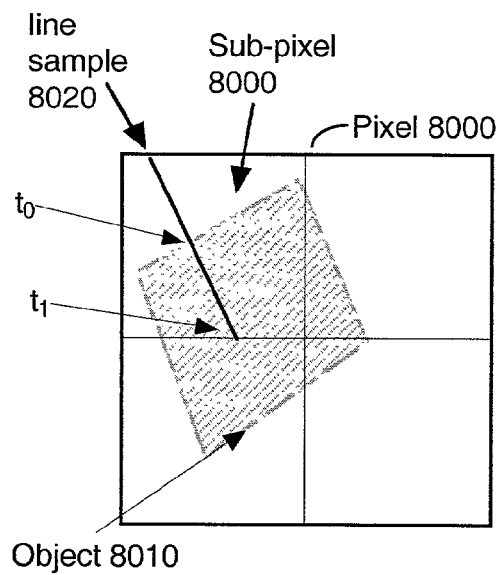
FIG. 8A illustrates the projection of an object from an object scene onto an image plane in a preferred embodiment of the present invention.
Figure 8C:
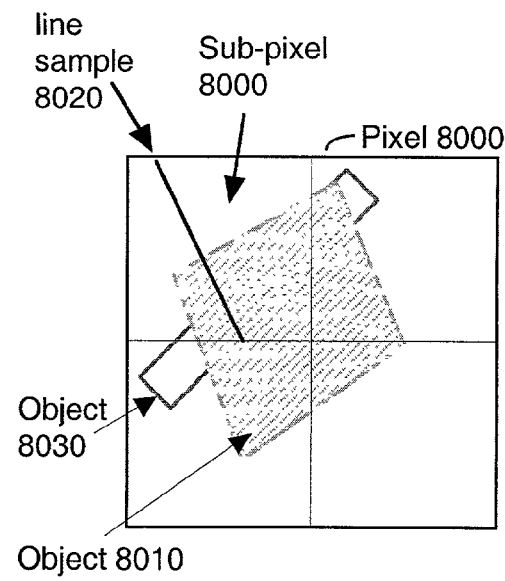
FIG. 8C illustrates the projection of an object from an object scene onto an image plane in a preferred embodiment of the present invention.

FIG. 8A illustrates the result of projecting object 8010 onto image plane 110 in the area of pixel 8000. In this particular illustration, renderer 23 is processing line sample 8020.

The sub-steps of step 1040 are described in greater detail with reference to FIG. 8B. In a first sub-step, renderer 23 isolates a new segment of line sample 8020 that overlaps object 8010 (step 8010). More specifically, renderer 23 determines the end-point coordinates $t_o$ and $t_1$ of a new segment as illustrated in FIG. 8A.

After determining end-point coordinates $t_0$ and $t_1$, renderer 23 calculates the distance of object 8010 from image plane 110 at the end-point coordinates $t_0$ and $t_1$ (step 8020). Additionally, renderer 23 obtains the transparency value and color value as described with reference to step 1010 (step 8022).

If the transparency value obtained in step 8022 indicates that the object associated with the new segment is transparent (step 8024-Yes), renderer 23 stores information related to the segment in memory 20 for subsequent processing as described in detail below (step 8080). In particular, step 8080 includes adding the segment to a transparency list also maintained in memory 20. Renderer 23 then returns to step 1030 to project another object onto image plane 110.

If the transparency value obtained in step 8022 indicates that the object associated with the new segment is not transparent (step 8024-No), renderer 23 determines whether there is an overlap between an old segment (i.e., a segment already processed and stored in memory 20) and the new segment (step 8028). Renderer 23 accomplishes this by a comparison of end-point coordinates associated with the new segment and an old segment.

If there is no overlap between an old segment and the new segment (step 8032-No), renderer 23 stores information related to the new segment (e.g., end-point coordinates, transparency value, color value) in memory 20 (step 8080). Renderer 23 then returns to step 1030 to project another object onto image plane 110.

In the example illustrated in FIG. 8A, no other segments are present because object 8010 is the first object projected onto image plane 110.

After returning to step 1030, renderer 23 projects additional objects onto image plane 110 (step 1030). Renderer 23 executes steps 8010 through 8028 for additional objects projected onto image plane 110. If an additional object is not transparent and there is an overlap between a segment associated with the additional object and an old segment (step 8032-Yes), renderer 23 determines the state of occlusion between the object associated with the new segment and the object associated with the old segment (step 8028). Renderer 23 makes this determination by evaluating the end-point coordinates of each segment and the z-depth values of the objects associated with the two segments at those coordinates. Essentially, renderer 23 determines whether the object associated with the new segment or the object associated with the old segment occludes the other (i.e., is closer to image plane 110) where there is an overlap between the two segments and line sample 8020.

If the object associated with the old segment completely occludes the object associated with the new segment (step 8038-Yes), renderer 23 determines if the new segment overlaps another old segment (step 8070). If so (step 8070-Yes), renderer 23 returns to step 8028, which is described above. If not (step 8070-No), renderer 23 stores in memory 20 information related to the portions of the new segment (e.g., end-point coordinates, transparency value, color value), if any, for which there is no overlap with an older segment in memory 20 (step 8080). Renderer 23 then returns to step 1030 to project another object onto image plane 110.

If the object associated with the new segment completely occludes the object associated with the old segment (step 8038-No, step 8040-Yes), renderer 23 computes the z-depth values of the object associated with the new segment at positions overlapped by the end-point coordinates of the old segment and updates the old segment's information with the new z-depth values and other information related to the new segment (step 8050).

Figure 8D:
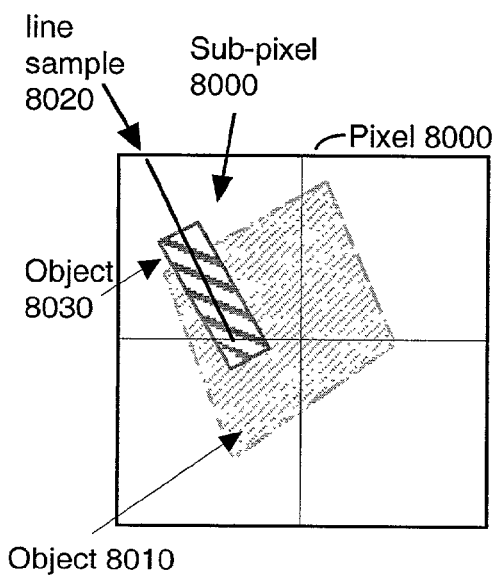
FIG. 8D illustrates the projection of an object from an object scene onto an image plane in a preferred embodiment of the present invention.

FIG. 8D illustrates object 8030 projected onto image plane 110 such that object 8030 completely occludes object 8010 where object 8030, object 8010, and line sample 8020 overlap. Accordingly, object 8010 is not visible along line sample 8020.

Renderer 23 then determines if the new segment overlaps another old segment (step 8070). If so (step 8070-Yes), renderer 23 returns to step 8028, which is described above. If not (step 8070-No), renderer 23 stores in memory 20 information related to the portions of the new segment (e.g., end-point coordinates, transparency value, color value), if any, for which there is no overlap with an older segment in memory 20 (step 8080). Renderer 23 then returns to step 1030 to project another object onto image plane 110.

If the new segment only partially occludes the old segment (step 8038-No, step 8040-No), renderer 23 adjusts an end-point of the old segment to reflect the intersection with the new segment (step 8060). Renderer 23 also sets the z-depth value associated with the adjusted end-point to reflect the z-depth value of the object associated with the old segment at the position marked by the adjusted end-point (step 8060 continued).

Figure 8E:
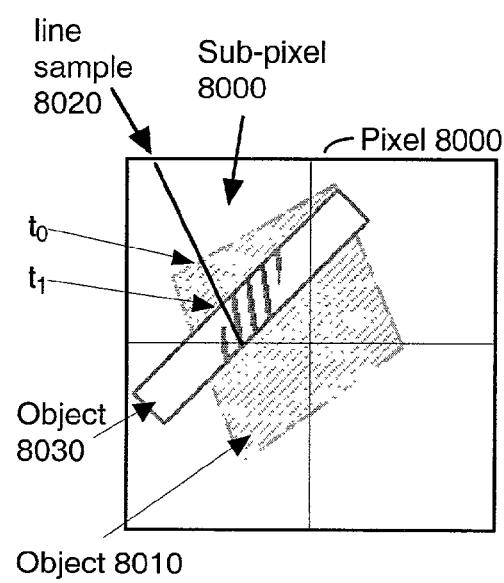
FIG. 8E illustrates the projection of an object from an object scene onto an image plane in a preferred embodiment of the present invention.
Figure 8B:
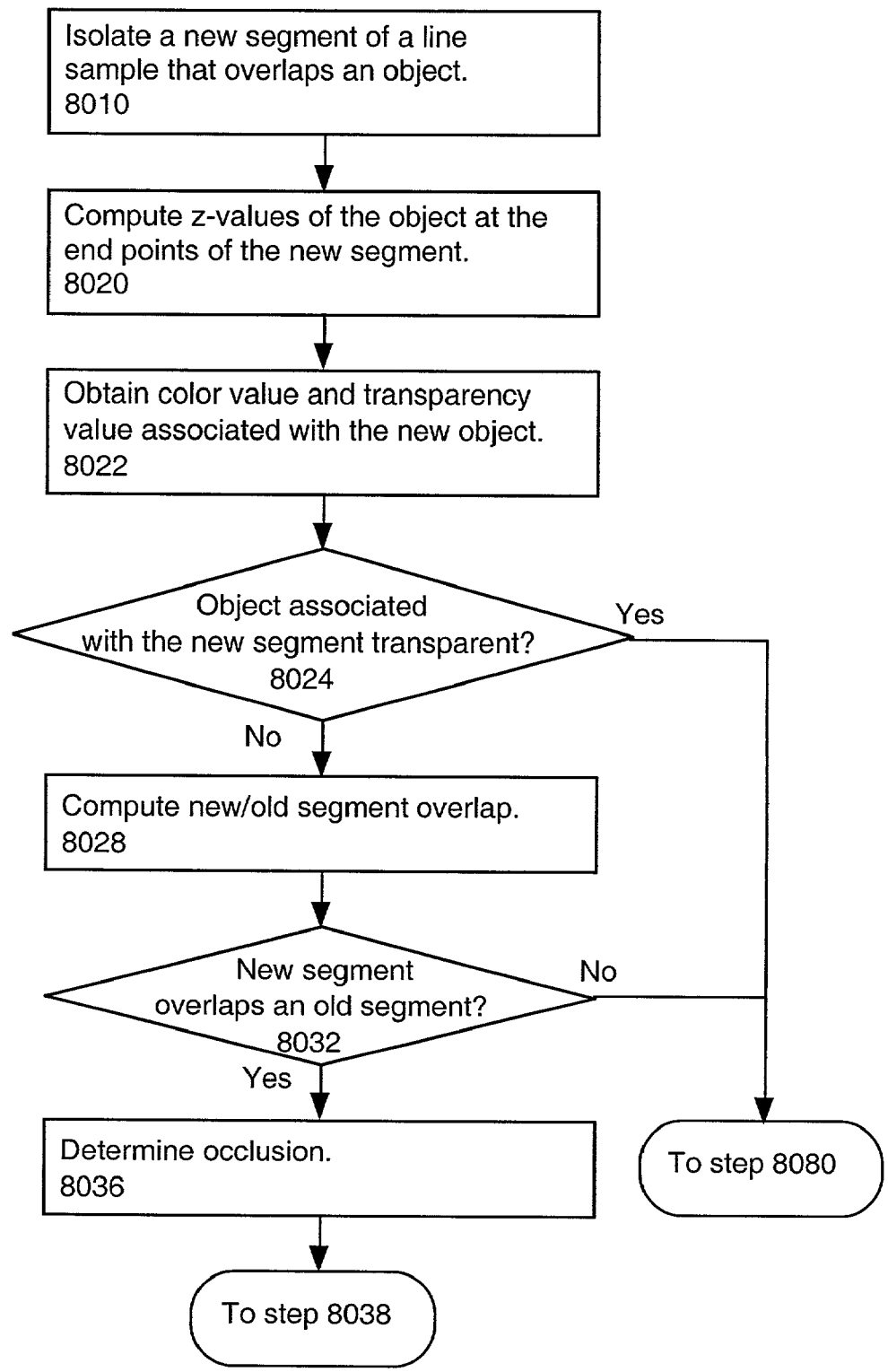
FIG. 8B illustrate processing steps used to develop an analytic representation of an object scene along a line sample.
Figure 8B:
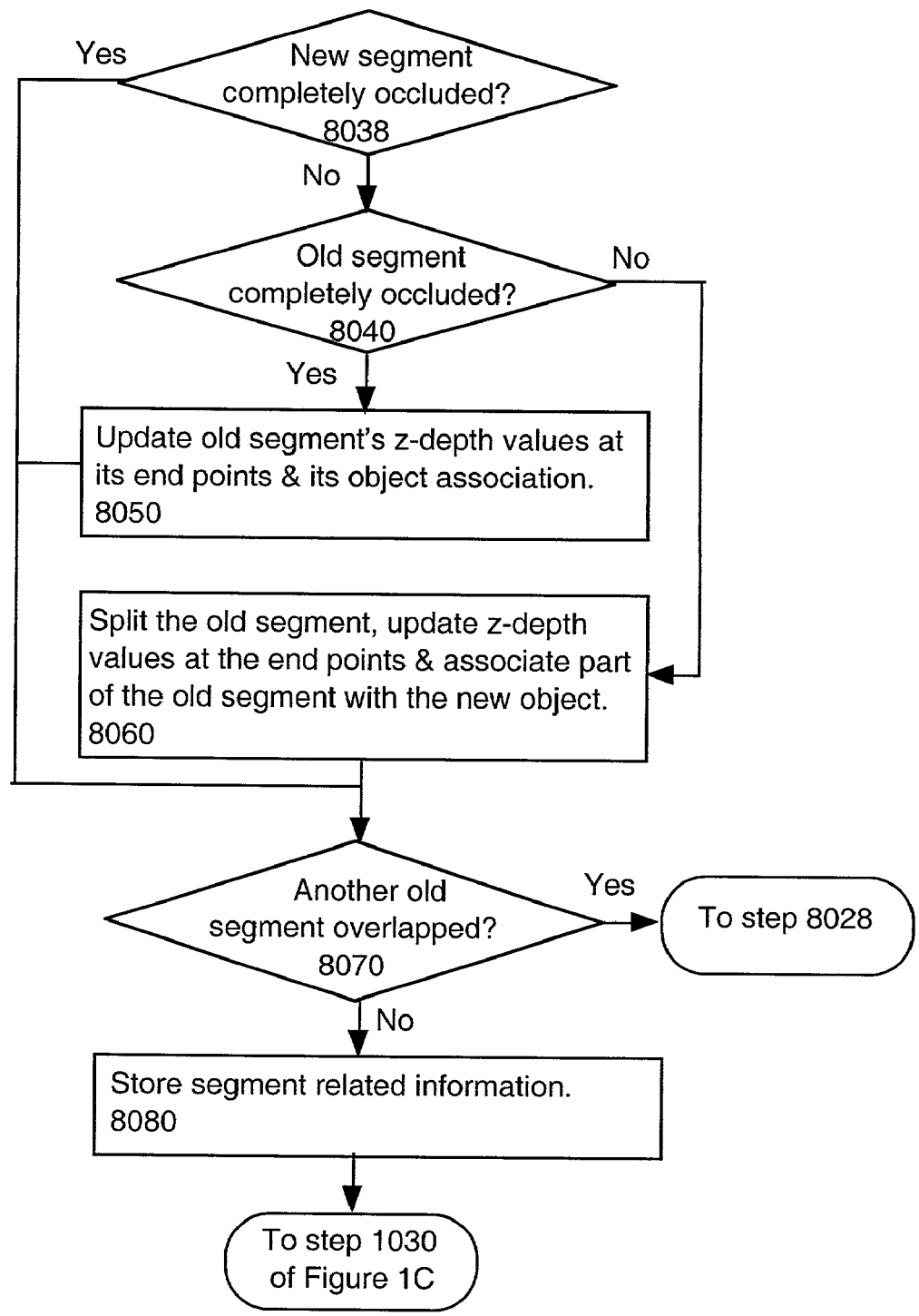

FIG. 8E illustrates object 8030 projected onto image plane 110 such that object 8030 only partially occludes object 8010. Accordingly, renderer 23 reduces the visibility of object 8010 along line sample 8020 but does not eliminate it. Note that end-point coordinate $t_1$, which is associated with object 8010, is in a new position in FIG. 8E to reflect the adjustment described with reference to step 8060.

Renderer 23 then determines if the new segment overlaps another old segment (step 8070). If so (step 8070-Yes), renderer 23 returns to step 8028, which is described above. If not (step 8070-No), renderer 23 stores in memory 20 information related to the portions of the new segment (e.g., end-point coordinates, transparency value, color value), if any, for which there is no overlap with an older segment in memory 20 (step 8080). Renderer 23 then returns to step 1030 to project another object onto image plane 110.

In another aspect of the present invention, renderer 23 updates a number of z-far values while processing objects projected onto image plane 110. More specifically, renderer 23 scans the isolated segments to determine the maximum distance of an object from image plane 110 that is associated with a segment of a line sample. Renderer 23 uses this value to update the z-far values associated with the line sample and various regions that include the line sample (e.g., sub-pixel, pixel, or image plane).

In preferred embodiments, however, renderer 23 adjusts the z-far value only if there is a valid association between substantially all of the line sample and one or more objects. Portions of a line sample that do not have an association with a segment lack a valid association with an object. In other words, these portions of a line sample do not overlap an object. Portions of a line sample that do not have an association with a segment that is consistent with adjacent segments also lack a valid association with an object. For example, if two segments are both associated with a first object and border a third segment, which is associated with a second object that is further away from image plane 110 than the first object, the third segment is possibly inconsistent. The third segment would be inconsistent if for example the first object has holes that allow an object behind it to be viewed. Renderer 23 determines whether this is the case by an examination of object scene data 21. Invalid associations with an object typically occur as a result of errors in object scene data 21 or the processing of object scene data 21 result in irregularities in the object scene. For example, a grid of micropolygons created to represent an object might have gaps between grid cells that are not representative of the object. As a result, small regions of a line sample might not be validly associated with an object. Accordingly, in preferred embodiments of the invention, renderer 23 adjusts the z-far value only if there is a valid association between substantially all of the line sample and one or more objects.

As noted above, renderer 23 stores transparent objects that a current line sample overlaps in memory 20. After renderer 23 projects all objects within a region of the current line sample onto image plane 110, renderer 23 processes the segments included in the transparency list and the segments associated with opaque objects visible along the current line sample. The processing includes sorting the segments included in the transparency list according to their z-depth values, isolating unique combinations of segments along the current line sample, and computing a color for each unique combination.

In alternative embodiments, renderer 23 processes transparent objects as renderer 23 projects them onto image plane 110. Thus, in these embodiments, renderer 23 continually eliminates or sorts transparent objects and portions of transparent objects as described above. Thus, these embodiments do not require the sorting step described below at this point in the process.

Figure 9A:
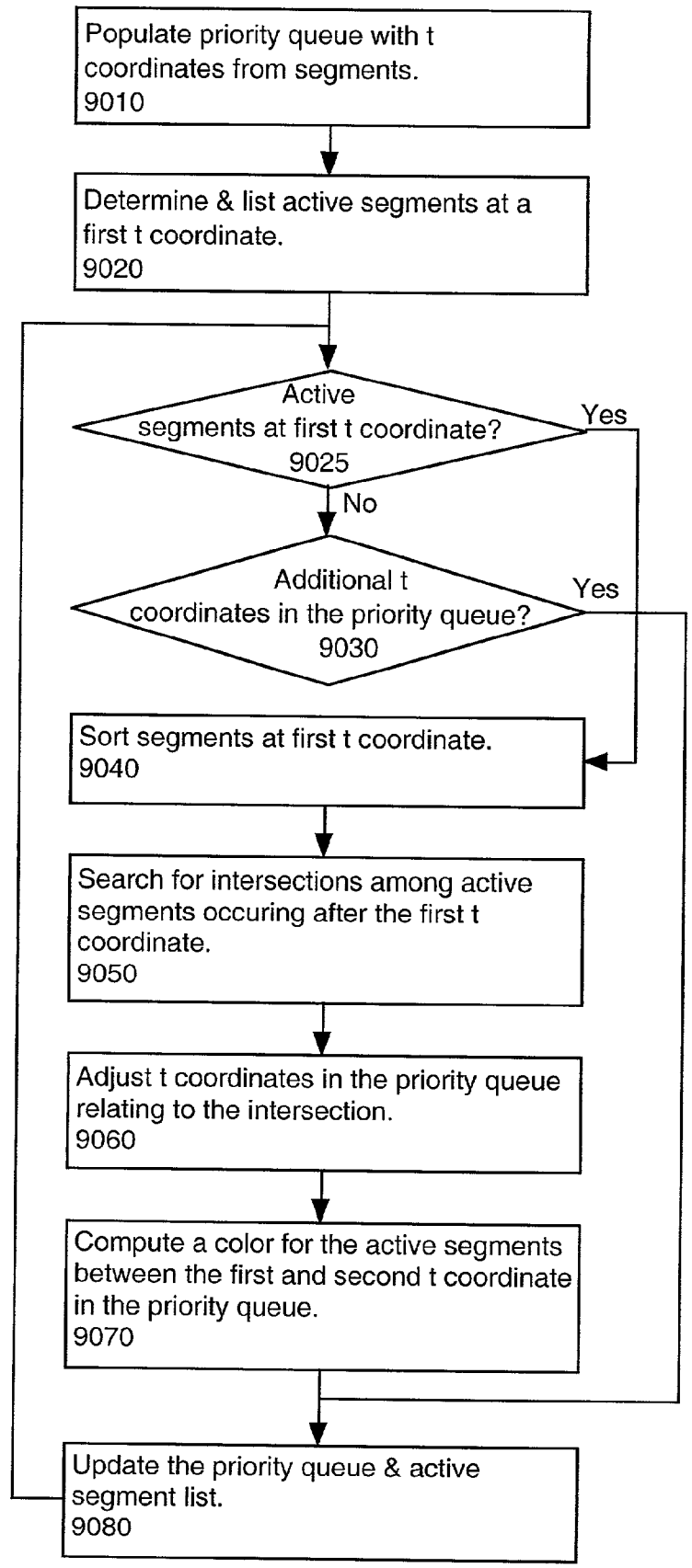
FIG. 9A illustrates processing steps that isolate unique sets of objects visible along and overlapped by a line sample sorted by distance from an image plane in a preferred embodiment of the present invention.
Figure 9B:
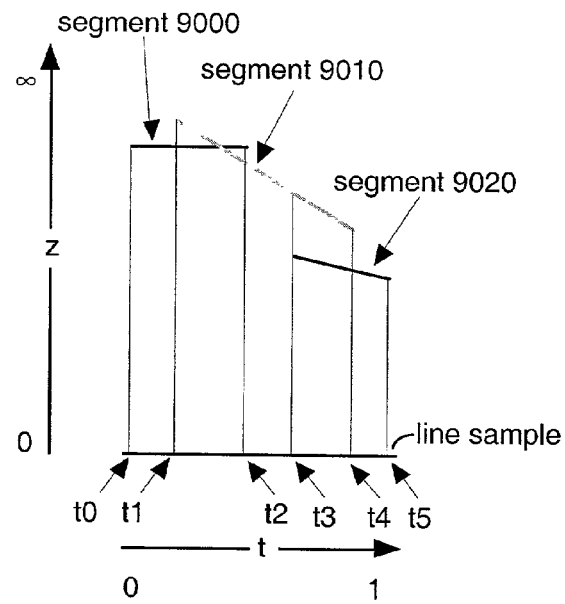
FIG. 9B illustrates objects visible along and overlapped by a line sample sorted by distance from an image plane in a preferred embodiment of the present invention.

Attention now turns to a more detailed description of an embodiment of this aspect of the invention. In a first processing step, renderer 23 populates a priority queue with the end-point coordinates (i.e., t coordinates) of segments associated with the current line sample (step 9010, FIG. 9A). The priority queue exists in memory 20 and comprises, for example, a linked list or an array. As noted above, the t coordinates indicate a distance from an end of a line sample. Renderer 23 preferably includes identifiers of the segments associated with each t coordinate in the priority queue since a plurality of segments can share a t coordinate. Furthermore, renderer 23 preferably sorts the priority queue by t coordinate value. FIG. 9B illustrates, among other things, the end-point coordinates of segments that a line sample overlaps (i.e., t0–t6).

Renderer 23 then determines and lists segments that share the first t coordinate in the priority queue (step 9020). The first t coordinate is the lowest value of t at which a segment overlaps the current line sample. Renderer 23 accomplishes this step by examining the priority queue, which as noted above maintains segment identifiers in association with each t coordinate. Each segment identified at the first t coordinate is an active segment, which means that the segment overlaps a portion of the line sample identified by the first t coordinate. In the example illustrated in FIG. 9B, only segment 9000 is present at the first t coordinate, which t0 marks.

If there are active segments for the current t coordinate (step 9025-Yes), renderer 23 sorts the active segments according to z-depth (step 9040). Thus, renderer 23 determines which segments are closest to the current line sample and image plane 110.

Figure 9C:
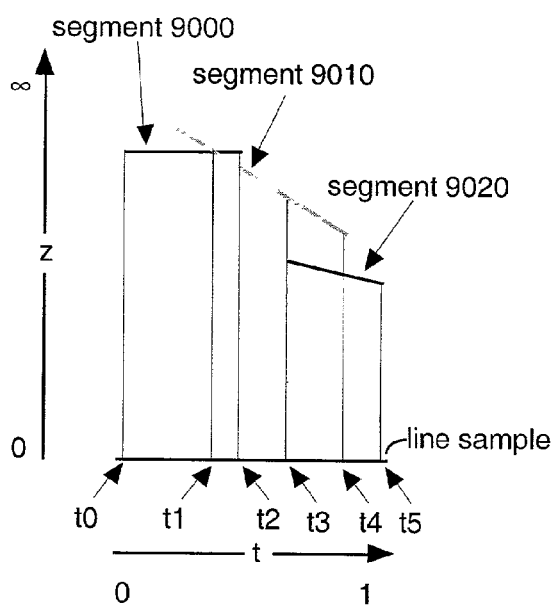
FIG. 9C illustrates objects visible along and overlapped by a line sample sorted by distance from an image plane after an intersection is processed in a preferred embodiment of the present invention.

Renderer 23 then searches along each active segment for intersections with other segments (step 9050). As illustrated in FIG. 9B, segment 9000 intersects with segment 9010. Renderer 23 therefore inserts a t coordinate marking the intersection into the priority queue (step 9060). FIG. 9B illustrates this t coordinate as t3. Because renderer 23 detects an intersection, renderer 23 preferably determines whether the intersection affects the visibility of the intersecting objects. In the example illustrated in FIG. 9B, segment 9010 is transparent, but segment 9000 is opaque. According, the portion of segment 9010 between t2 and t3 is not visible. Accordingly, renderer 23 removes t coordinate t2 from the priority queue (step 9060). FIG. 9C illustrates this example after adjusting the priority queue as described above. In this example, therefore, only segment 9000 is active between t0 and t1 even though the current line sample overlaps a portion of segment 9010 over part of this range.

Renderer 23 then computes a color with standard computer graphics compositing formulas for the active segments along the line sample between the first t coordinate and the second t coordinate value in the priority queue (step 9070). Renderer 23 maintains the color value in memory 20 along with information such as the values of the first and second t coordinates.

Figure 9D:
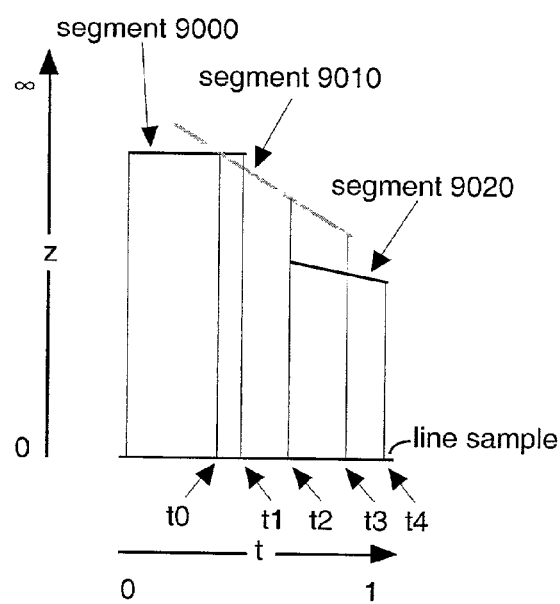
FIG. 9D illustrates objects visible along and overlapped by a line sample sorted by distance from an image plane after a priority queue is adjusted in a preferred embodiment of the present invention.

Renderer 23 then updates the priority queue and active segments (step 9080). Part of this step includes removing the first t coordinate from the priority queue. Accordingly, renderer 23 creates a 'new' first t coordinate. FIG. 9D illustrates the example illustrated in FIG. 9C after adjusting the priority queue as described.

Additionally, renderer 23 updates the active segments. As noted above, end-point coordinates of segments are added to the priority queue. Accordingly, the second t coordinate in the priority queue is often an end-point coordinate of a segment marking the end (as opposed to the beginning) of the segment. Since the segment has no further affect on the color of the line sample, it is no longer active.

Further, the second t coordinate is often an end-point coordinate of a segment marking the beginning of the segment. Thus, this segment is now an active segment if visible from image plane 110.

Similarly, the second t coordinate can mark an intersection between two segments. Because some or all of the segments are possibly transparent, both segments are often visible before and after the intersection. However, the ordering of transparent segments does affect color values, so renderer 23 does separately compute a color value for two transparent objects before and after an intersection between the two. Additionally, one of the intersecting segment is not visible before or after an intersection. Renderer 23 therefore separately computes a color value before and after the intersection between the two segments.

In the example illustrated in FIG. 9D, only segment 9000 is visible before and after the intersection with segment 9010, so it remains an active segment. Segment 9010 is, however, visible only after the intersection with segment 9000. Accordingly, segment 9010 becomes active.

Renderer 23 then returns to step 9025 to determine whether there is an active segment to process. In the example illustrated in FIG. 9D, segment 9000 and segment 9010 are active (step 9025-Yes), so renderer 23 proceeds to step 9040.

If there are no active segments to process (step 9025-No), renderer 23 determines whether there are additional t coordinates in the priority queue (step 9030). If not (step 9030-No), render 23 combines the color value of each cross section of segments to determine a color value for the line sample. Preferably, renderer 23 weights the contribution of each cross section to the final color value of the line sample by reference to the length of each cross section.

If there are additional t coordinates in the priority queue (step 9030-Yes), renderer 23 updates the priority queue and active segment list (step 9080). In this case, there is a portion of the current line sample with which no segment is associated. It is possible that certain portions of the image scene lack definition (i.e., objects). Additionally, this is possibly a result of an error in the processing of the object scene data 21.

In some embodiments, renderer 23 updates the priority queue by removing the current first t coordinate, thereby creating a new t coordinate. Renderer 23 also determines which segments, if any, are now active. Renderer 23 then returns to step 9025. Thus in these embodiments, renderer 23 ignores the portions of the line sample that lack an active segment. Further, these portions of the line sample are not a factor in the calculation of a color value for the line sample.

In other embodiments, renderer 23 takes certain steps to eliminate these portions before computing the color of the line sample as described above. As described above, some portions of a line sample lack a valid association with an object. In other words, renderer 23 did not define a segment for these portions of the line sample. Again, these portions are often the result of processing errors. In such cases, renderer 23 preferably extends the segments bordering such a portion of the line sample to create two new segments.

Figure 9E:
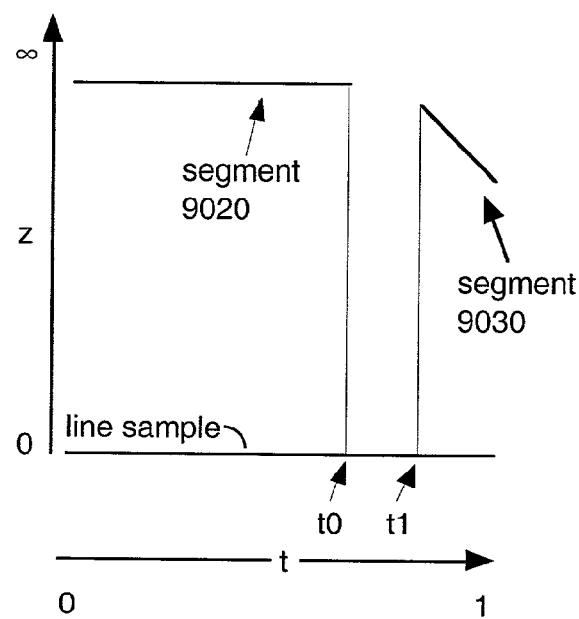
FIG. 9E illustrates objects visible along and overlapped by a line sample sorted by distance from an image plane with a gap between the segments in a preferred embodiment of the present invention.

FIG. 9E illustrates a portion of the line sample that lacks a valid association with an object. Consistent with the process described above, t coordinates mark a beginning and an end of a segment. Specifically, t0 marks the end of segment 9020 and t1 marks the beginning of segment 9030.

Figure 9F:
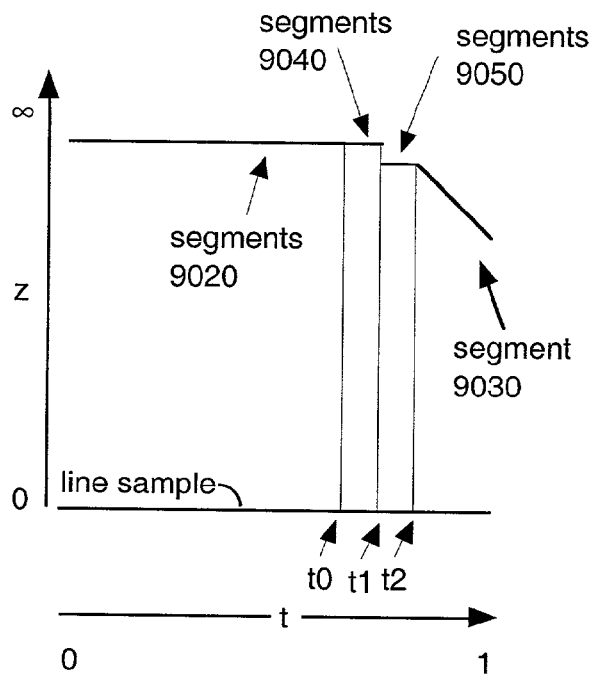
FIG. 9F illustrates objects visible along and overlapped by a line sample sorted by distance from an image plane with a gap between the segments corrected in a preferred embodiment of the present invention.

FIG. 9F illustrates segment 9040 and segment 9050 inserted by renderer 23. Renderer 23 extends the values of segment 9020 to a position between segment 9020 and 9030, which t1 marks as illustrated in FIG. 9F. Thus, segment 9040 maintains the z-depth, color, and transparency values of segment 9020 at a position marked by t0 between t0 and t1. Similarly, segment 9050 maintains the z-depth, color, and transparency values of segment 9020 at a position marked by t2 between t1 and t2. As indicated above, renderer 23 also added t coordinate t1, which marks the intersection of segment 9040 and segment 9050, to the priority queue as illustrated in FIG. 9F.

In this particular embodiment, renderer 23 does not maintain the trajectory of segment 9030; however, some embodiments of the invention do so. Additionally, in other embodiments, renderer 23 does not extend the two segments to a central point in the invalid portion. For example, in some embodiments, one of the end-point properties of one of the adjacent segments is randomly selected and extended across the entire invalid portion.

After adjusting the priority queue and inserting segments as needed, renderer 23 returns to step 9025.

After computing a color value for a number of line samples, renderer 23 combines the color values of the line samples to produce a color value for a pixel (step 1050). In some embodiments, renderer 23 uses only those line samples distributed within a given pixel to compute a color value for that pixel. In preferred embodiments, however, renderer 23 uses line samples distributed outside the boundary of a given pixel to compute a color value for that pixel. For example, renderer 23 might also use line samples distributed within pixels bordering a given pixel to compute a color value for that pixel. In these embodiments, renderer 23 preferably weights the contribution of each line sample to the computation of a color value according to each line sample's distance from the center of the pixel for which renderer 23 is computing a color value.

As described above, some embodiments of the invention distribute line samples by selecting an orientation and translation amount by reference to a non-regular sequence of numbers. In these embodiments, smaller regions of sub-pixels or pixels are over sampled. This means that there is an overabundance of relatively short line samples. To minimize the effect of such an overabundance of relatively short line samples, the contribution of each line sample is weighted according to a length of the line sample.

In embodiments that distribute line samples by selecting an orientation and area by reference to a non-regular sequence of numbers, the contribution of a line sample to the color of a pixel is not weighted according to its length. As described above, there is not an overabundance of short line samples in these embodiments.

In alternative embodiments, renderer 23 uses an image function to define a color value for points across image plane 110. The function permits renderer 23 to determine a color value for each point from the line samples through interpolation or extrapolation. Thus, in these embodiments, renderer 23 does not combine the line samples per se. Instead, renderer 23 uses the set of line samples to predict a color value at a set of points on the image plane. Renderer 23 then combines the set of points to compute a color value for each pixel.

After computing a color value for each pixel, an image frame or view of an object scene is complete.

The present invention can be implemented as a computer program product that includes a computer program mechanism embedded in a computer readable storage medium. For instance, the computer program product could contain the program modules shown in FIG. 1A. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, in some embodiments, renderer 23 computes the view of an object scene along only a selected portion of each line sample. In these embodiments, renderer 23 preferably uses a non-regular sequence of numbers to select the size and location of a portion of a line sample. Additionally, in some embodiments, renderer 23 subdivides a pixel to form a plurality of sub-pixels, but places a line sample in only a subset of the sub-pixels. In these embodiments, renderer 23 preferably uses a non-regular sequence of numbers to select the sub-pixels that form the subset.

What is claimed is:

1. A method of forming a view of an object scene, comprising:
   distributing a set of line samples, each having an orientation, across an object scene such that the distribution of the orientations of the set of line samples is non-regular, wherein distributing includes:
      projecting objects in the object scene onto an image plane; and
      orienting the set of line samples on the image plane, wherein the set of line samples reside entirely within the image plane;
   computing a view of the object scene along each line sample in the set of line samples; and
   combining the view of the object scene along each line sample in the set of line samples to form a view of the object scene.

2. The method of claim 1, further comprising transforming an object in the object scene from a three-dimensional representation to a two-dimensional representation.

3. The method of claim 1, wherein the distributing step comprises:
   selecting an orientation for a line sample from the set of line samples; and
   choosing a plane for the line sample,
   whereby the line sample passes through the chosen plane with the selected orientation.

4. The method of claim 3, wherein the orientation is greater than or equal to zero-degrees and less than one hundred and eighty-degrees.

5. The method of claim 1, wherein the computing step comprises:
   isolating a segment of the line sample that overlaps an object; and
   calculating a distance of the object from the segment.

6. The method of claim 5, wherein the isolating step includes calculating a distance between a first end of the line sample and a transition on the line sample from not overlapping the object to overlapping the object, wherein a first end-point coordinate of the segment is derived from the distance.

7. The method of claim 5, wherein the isolating step includes calculating a distance between the first end of the line sample and a transition on the line sample from overlapping the object to not overlapping the object, wherein a second end-point coordinate of the segment is derived from the distance.

8. The method of claim 5, wherein a first end-point coordinate of the segment is set to zero if a first end of the line sample overlaps the object.

9. The method of claim 5, wherein a second end-point coordinate of the segment is set to a length of the line sample if a second end of the line sample overlaps the object.

10. The method of claim 5, further comprising maintaining object data in relation to the segment.

11. The method of claim 10, wherein said object data includes a color value of the object.

12. The method of claim 10, wherein said object data includes the distance of the object from the object scene.

13. The method of claim 10, wherein said object data includes a transparency value of the object.

14. The method of claim 5, wherein the distance is calculated from a first end of the segment.

15. The method of claim 14, further comprising calculating a second distance of the object from the segment, wherein the second distance is calculated from a second end of the segment.

16. The method of claim 5, further comprising
identifying a portion of the line sample overlapping a set of objects; and computing a color value for the portion by reference to the set of objects, whereby a color value for a line sample is calculated.

17. The method of claim 16, wherein the set of objects include a transparent object.

18. The method of claim 16, wherein the set of objects includes an opaque object.

19. The method of claim 16, wherein the set of objects includes one or more objects.

20. The method of claim 16, wherein the computing step includes sorting the segments that comprise the set of objects by reference to a distance from the line sample.

21. The method of claim 16, wherein the identifying step includes ascertaining a first position on the line sample that marks a beginning of an overlap of one or more objects by the line sample;
locating a second position on the line sample that marks an event affecting the computing step; and
designating the portion of the one or more objects that the line sample overlaps between the first and second position as a set of objects.

22. The method of claim 21, wherein the event marks an end of an overlap of one or more objects by the line sample.

23. The method of claim 21, wherein the event marks a beginning of an overlap of one or more objects by the line sample.

24. The method of claim 21, wherein the event marks an intersection between one or more objects that the line sample overlaps.

25. The method of claim 16, further comprising computing a color value for the line sample by reference to a color value computed for one or more said sets of objects.

26. The method of claim 16, wherein a contribution of a set of objects to the color value for the line sample is a function of a length of the portion of the line sample overlapping the set of objects.

27. The method of claim 5, further comprising
selecting a number of positions along the line sample;
computing a color value by reference to one or more objects the line sample overlaps at the number of positions; and
combining the color value computed for each of the positions along the line sample, whereby a color value for a line sample is calculated.

28. The method of claim 1, wherein the combining step comprises selecting a subset of line samples from the set of line samples; and computing a color value for the subset of line samples.

29. The method of claim 28, wherein the color value is assigned to a pixel.

30. The method of claim 28, wherein the subset of lines samples is distributed within a region of the object scene.

31. The method of claim 30, wherein the region comprises a pixel.

32. The method of claim 30, wherein the region comprises a set of pixels.

33. The method of claim 28, wherein the computing step includes assigning a weight to a line sample in the subset of line samples, said weight affecting a contribution of the line sample to the color value.

34. The method of claim 33, wherein the weight is a function of a distance of a line sample from a position on the object scene.

35. The method of claim 28, wherein the position is a center of a pixel.

36. The method of claim 33, wherein the weight of a line sample is a function of a length of the line sample.

37. The method of claim 36, wherein the length of the line sample is determined by reference to a portion of the line sample for which a color value is defined.

38. The method of claim 36, wherein the weight is reduced by an amount proportional to an amount by which the line sample is shorter than a maximum line sample length.

39. The method of claim 38, wherein the maximum line sample length is a maximum distance across a pixel.

40. The method of claim 1, wherein the combining step includes
selecting a set of points across the object scene such that the points form a regular pattern; and
interpolating the view of objects in an object scene along each line sample in the set of line samples at each point in the set of points.

41. The method of claim 1, wherein the combining step includes
selecting a set of points across the object scene such that the points form a regular pattern; and
extrapolating the view of objects in an object scene along each line sample in the set of line samples to each point in the set of points.

42. A method of forming a view of an object scene, comprising:
distributing a set of line samples across an object scene such that the distribution of the set of line samples is non-regular;
computing a view of the object scene along each line sample in the set of line samples;
combining the view of object scene along each line sample in the set of line samples to form a view of the object scene;
wherein the distributing step comprises
selecting an orientation for a line sample from the set of line samples and
choosing a plane for the line sample, whereby the line sample passes through the chosen plane with the selected orientation; and
wherein the orientation is selected by reference to a low discrepancy sequence of numbers.

43. A method of forming a view of an object scene, comprising:
distributing a set of line samples across an object scene such that the distribution of the set of line samples is non-regular;
computing a view of the object scene along each line sample in the set of line samples;
combining the view of object scene along each line sample in the set of line samples to form a view of the object scene;
wherein the distributing step comprises
projecting objects in the object scene onto an image plane;

orienting the set of line samples to reside entirely within the image plane, wherein orienting includes selecting an orientation for a line sample from the set of line samples and choosing a second plane for the line sample, whereby the line sample passes through the chosen second plane with the selected orientation; and wherein the orientation is selected by reference to a pseudo-random sequence of numbers.

44. A method of forming a view of an object scene, comprising:

distributing a set of line samples, each having an orientation, across an object scene such that the distribution of the orientations of the set of line samples is non-regular;

computing a view of the object scene along each line sample in the set of line samples;

combining the view of object scene along each line sample in the set of line samples to form a view of the object scene;

wherein the distributing step comprises projecting objects in the object scene onto an image plane;

orienting the set of line samples to reside entirely within the image plane, wherein orienting includes selecting an orientation for a line sample from the set of line samples and choosing a second plane for the line sample, whereby the line sample passes through the chosen second plane with the selected orientation; and wherein the second plane passes through a central position within a region of the object scene.

45. A method of forming a view of an object scene, comprising:

distributing a set of line samples, each having an orientation, across an object scene such that the distribution of the orientations of the set of line samples is non-regular;

computing a view of the object scene along each line sample in the set of line samples;

combining the view of object scene along each line sample in the set of line samples to form a view of the object scene;

wherein the distributing step comprises projecting objects in the object scene onto an image plane;

orienting the set of line samples to reside entirely within the image plane, wherein orienting includes selecting an orientation for a line sample from the set of line samples and choosing a second plane for the line sample, whereby the line sample passes through the chosen second plane with the selected orientation; and wherein the choosing step comprises selecting a translation amount; and translating the line sample by reference to the translation amount.

46. The method of claim 45, wherein the line sample is confined to an area of the object scene and the line sample is translated from a position on a perimeter of the area.

47. The method of claim 46, wherein the position is an origin of the area.

48. The method of claim 47, wherein the origin is selected by reference to the orientation.

49. The method of claim 45, wherein the translation amount is limited to a translation range, said translation range being a function of the orientation and a size of the area.

50. A method of forming a view of an object scene, comprising:

distributing a set of line samples across an object scene such that the distribution of the set of line samples is non-regular;

computing a view of the object scene along each line sample in the set of line samples;

combining the view of object scene along each line sample in the set of line samples to form a view of the object scene;

wherein the distributing step comprises selecting an orientation for a line sample from the set of line samples; and choosing a plane for the line sample, whereby the line sample passes through the chosen plane with the selected orientation;

wherein the choosing step comprises selecting a translation amount; and translating the line sample by reference to the translation amount;

wherein the translation amount is limited to a translation range, said translation range being a function of the orientation and a size of the area; and wherein the translation range is equal to h×cos(θ), where h is a maximum distance across the area, and where θ is derived from the orientation.

51. The method of claim 50, wherein the maximum distance is not greater than $\sqrt{x^2+y^2}$ where x is a width of the area, and where y is a height of the area.

52. The method of claim 50, wherein θ is equal to the orientation adjusted by 45-degrees.

53. The method of claim 50, wherein θ is equal to the orientation adjusted by 135-degrees.

54. A method of forming a view of an object scene, comprising:

distributing a set of line samples, each having an orientation, across an object scene such that the distribution of the orientations of the set of line samples is non-regular;

computing a view of the object scene along each line sample in the set of line samples;

combining the view of object scene along each line sample in the set of line samples to form a view of the object scene; and wherein the distributing step comprises projecting objects in the object scene onto an image plane;

positioning the set of line samples on the image plane, wherein the set of line samples reside entirely within the image plane;

selecting for each line sample an area defined by an intersection of the line sample and a region of the object scene within which each line sample is positioned; and controlling the selecting step so that a selection of the area from a range of possible areas is substantially uniform.

55. A method of forming a view of an object scene, comprising:

distributing a set of line samples, each having an orientation, across an object scene such that the distribution of the orientations of the set of line samples is non-regular;

computing a view of the object scene along each line sample in the set of line samples;

combining the view of object scene along each line sample in the set of line samples to form a view of the object scene;

wherein the distributing step comprises
projecting objects in the object scene onto an image plane;
orienting the set of line samples to reside entirely within the image plane, wherein orienting includes selecting an orientation for a line sample from the set of line samples and choosing a second plane for the line sample, whereby the line sample passes through the chosen second plane with the selected orientation; and wherein the choosing step comprises
selecting an area; and
positioning the line sample within a region of the object scene such that the area is formed within the region by an intersection of the line sample and the region, whereby the second plane is chosen.

56. The method of claim 55, wherein the positioning step includes translating the line sample by a translation amount derived from the area.

57. The method of claim 56 wherein the line sample is translated from a position on the perimeter of the region.

58. The method of claim 57, wherein the position is an origin of the region.

59. The method of claim 58, wherein the origin is selected by reference to the orientation.

60. A method of forming a view of an object scene, comprising:
distributing a set of line samples across an object scene such that the distribution of the set of line samples is non-regular;
computing a view of the object scene along each line sample in the set of line samples;
combining the view of object scene along each line sample in the set of line samples to form a view of the object scene;
wherein the distributing step comprises
selecting an orientation for a line sample from the set of line samples; and
choosing a plane for the line sample, whereby the line sample passes through the chosen plane with the selected orientation;
wherein the choosing step comprises
selecting an area; and
positioning the line sample within a region of the object scene such that the area is formed within the region by an intersection of the line sample and the region, whereby the plane is chosen;
wherein the positioning step includes translating the line sample by a translation amount derived from the area; and
wherein the translation amount is $$\frac{\sqrt{2 \times s \times \text{area}}}{\sqrt{1+s^2}},$$

where s is a function of the orientation, and area is greater than or equal to zero and less than $$\frac{s}{2}.$$

61. The method of claim 60, the function of the orientation is the cot (θ), where θ is derived from the orientation.

62. The method of claim 61, wherein θ is equal to the orientation adjusted by 90-degrees.

63. The method of claim 61, wherein θ is equal to the orientation adjusted by 180-degrees.

64. A method of forming a view of an object scene, comprising:
distributing a set of line samples across an object scene such that the distribution of the set of line samples is non-regular;
computing a view of the object scene along each line sample in the set of line samples;
combining the view of object scene along each line sample in the set of line samples to form a view of the object scene;
wherein the distributing step comprises
selecting an orientation for a line sample from the set of line samples; and
choosing a plane for the line sample, whereby the line sample passes through the chosen plane with the selected orientation;
wherein the choosing step comprises
selecting an area; and
positioning the line sample within a region of the object scene such that the area is formed within the region by an intersection of the line sample and the region, whereby the plane is chosen;
wherein the positioning step includes translating the line sample by a translation amount derived from the area; and
wherein the translation amount is $$\frac{\left(\text{area}+\frac{s}{2}\right)}{\sqrt{1+s^2}},$$

where s is a function of the orientation, and where area is greater than or equal to $$\frac{s}{2}$$

and less than $$1-\frac{s}{2}.$$

65. The method of claim 64, the function of the orientation is the cot(θ), where θ is derived from the orientation.

66. The method of claim 65, wherein θ is equal to the orientation adjusted by 90-degrees.

67. The method of claim 65, wherein θ is equal to the orientation adjusted by 180-degrees.

68. A method of forming a view of an object scene, comprising:

distributing a set of line samples across an object scene such that the distribution of the set of line samples is non-regular;
computing a view of the object scene along each line sample in the set of line samples;
combining the view of object scene along each line sample in the set of line samples to form a view of the object scene;
wherein the distributing step comprises
selecting an orientation for a line sample from the set of line samples; and
choosing a plane for the line sample, whereby the line sample passes through the chosen plane with the selected orientation;
wherein the choosing step comprises
selecting an area; and
positioning the line sample within a region of the object scene such that the area is formed within the region by an intersection of the line sample and the region, whereby the plane is chosen;
wherein the positioning step includes translating the line sample by a translation amount derived from the area;
wherein the line sample is translated from a position on the perimeter of the region; and
wherein the translation amount is $$\frac{s+1-\sqrt{2s(1-\text{area})}}{\sqrt{1+s^2}},$$

where s is a function of the orientation, and area is greater than or equal to $$1-\frac{s}{2}$$

and less than 1.

69. The method of claim 68, the function of the orientation is the cot ($\theta$), where $\theta$ is derived from the orientation.

70. The method of claim 69, wherein $\theta$ is equal to the orientation adjusted by 90-degrees.

71. The method of claim 69, wherein $\theta$ is equal to the orientation adjusted by 180-degrees.

72. A method of forming a view of an object scene, comprising:
distributing a set of line samples across an object scene such that the distribution of the set of line samples is non-regular;
computing a view of the object scene along each line sample in the set of line samples;
combining the view of object scene along each line sample in the set of line samples to form a view of the object scene;
wherein the distributing step comprises
selecting an orientation for a line sample from the set of line samples and
choosing a plane for the line sample, whereby the line sample passes through the chosen plane with the selected orientation; and
wherein the plane is selected by reference to a low discrepancy sequence of numbers.

73. A method of forming a view of an object scene, comprising:

distributing a set of line samples, each having an orientation, across an object scene such that the distribution of the orientations of the set of line samples is non-regular;
computing a view of the object scene along each line sample in the set of line samples;
combining the view of object scene along each line sample in the set of line samples to form a view of the object scene;
wherein the distributing step comprises
projecting objects in the object scene onto an image plane;
orienting the set of line samples to reside entirely within the image plane, wherein orienting includes selecting an orientation for a line sample from the set of line samples and choosing a second plane for the line sample, whereby the line sample passes through the chosen second plane with the selected orientation; and
wherein the second plane is selected by reference to a pseudorandom sequence of numbers.

74. A method of forming a view of an object scene, comprising:
distributing a set of line samples across an object scene such that the distribution of the set of line samples is non-regular;
computing a view of the object scene along each line sample in the set of line samples;
combining the view of object scene along each line sample in the set of line samples to form a view of the object scene; and
wherein the distributing step includes
defining a plurality of sub-ranges of line sample positions from a range of line sample positions;
selecting a line sample position from each of the plurality of sub-ranges of line sample positions; and
positioning a line sample by reference to the selected line sample position.

75. The method of claim 74, wherein the line sample position is selected by reference to a non-regular sequence of numbers.

76. The method of claim 75, further comprising assigning the line sample position to a line sample in an area of the object scene.

77. The method of claim 76, wherein the line sample to which the line position is assigned is selected by reference to a non-regular sequence of numbers.

78. A method of forming a view of an object scene, comprising:
distributing a set of line samples across an object scene such that the distribution of the set of line samples is non-regular;
computing a view of the object scene along each line sample in the set of line samples;
combining the view of object scene along each line sample in the set of line samples to form a view of the object scene; and
wherein the distributing step comprises:
positioning a first line sample on the object scene;
distributing candidate line samples across the object scene;
scoring the candidate line samples by reference to the first line sample; and
selecting from the candidate line samples a second line sample by reference to a result of the scoring step.

79. The method of claim 78, wherein the scoring step comprises an orientation comparison such that an orientation of the first line sample is compared to an orientation of a line sample from the candidate line samples.

80. The method of claim 79, wherein the comparison includes determining a difference between the orientation of the first line sample and the orientation of the line sample from the candidate line samples.

81. The method of claim 80, wherein the comparison further includes normalizing the difference, such that a number within a range of zero to one is produced.

82. The method of claim 81, wherein the normalizing step includes dividing the difference by one-half of a maximum orientation.

83. The method of claim 79, wherein a result of the orientation comparison is weighted to adjust a contribution of the orientation comparison to a result of the scoring step.

84. The method of claim 78, wherein the scoring step comprises a distance determination such that a distance between the first line sample and a line sample from the candidate line samples is determined.

85. The method of claim 84, wherein the distance is calculated by reference to a mid-way point on the first line sample and a mid-way point on the line sample from the candidate line samples.

86. The method of claim 84, wherein the distance is calculated by reference to a position in a region of the object scene in which the first line sample is positioned and a position in a second region of the object scene in which the line sample from the candidate line samples is distributed.

87. The method of claim 84, wherein the distance determination includes normalizing the distance, such that a number within a range of zero to one is produced.

88. The method of claim 87, wherein the normalizing step includes dividing the difference by a maximum value of the distance.

89. The method of claim 84, wherein a result of the distance determination is weighted to adjust a contribution of the distance determination to a result of the scoring step.

90. The method of claim 87, wherein a score of each line sample is equal to a $$a\left(\frac{angle}{90}\right) + b\left(\frac{distance}{maximum}\right),$$

where angle is a minimum angle between the first line sample and a line sample from the candidate line samples,
where distance is a distance between the first line sample and the line sample from the candidate line samples;
where maximum is a maximum value of the distance between the first line sample and the line sample from the candidate line samples;
where a is a factor that adjusts a contribution of $$\left(\frac{angle}{90}\right)$$

to the score; and
where b is a factor that adjusts a contribution of $$\left(\frac{distance}{maximum}\right)$$

to the score.

91. A method of forming a view of an object scene, comprising:
distributing a set of line samples across an object scene such that the distribution of the set of line samples is non-regular;
computing a view of the object scene along each line sample in the set of line samples;
combining the view of object scene along each line sample in the set of line samples to form a view of the object scene;
wherein the computing step comprises:
isolating a segment of the line sample that overlaps an object and
calculating a distance of the object from the segment; and
identifying an overlap between a new segment and an old segment, said old segment having been isolated before said new segment.

92. The method of claim 91, wherein said identifying step includes a comparison of a set of end-point values for the new segment and the old segment.

93. The method of claim 92, wherein the new segment and the old segment overlap if a first end-point of the new segment is closer to a first end of the line segment than a first end-point of the old segment and the first end-point of the new segment is further away from the first end of the line segment than the first end-point of the old segment.

94. The method of claim 92, wherein the new segment and the old segment overlap if a first end-point of the old segment is closer to a first end of the line segment than a first end-point of the new segment and a second end-point of the old segment is further away from the first end of the line segment than the first end-point of the new segment.

95. The method of claim 91, further comprising determining if the new object is closer to the object scene than the old object along the overlap.

96. The method of claim 95, further comprising adjusting the old segment to reflect the overlap.

97. The method of claim 96, wherein the adjusting step includes removing from the old segment a portion of the old segment included in the overlap.

98. The method of claim 96, wherein the adjusting step includes modifying an end-point of the old segment such that the overlap is eliminated.

99. The method of claim 96, wherein the old segment is shortened by a length of the overlap.

100. The method of claim 96, wherein the adjusting step includes calculating a second distance of the old object from the segment, wherein the second distance is calculated from a new end-point coordinate resulting from the adjusting step.

101. A method of forming a view of an object scene, comprising:
distributing a set of line samples across an object scene such that the distribution of the set of line samples is non-regular;
computing a view of the object scene along each line sample in the set of line samples;
combining the view of object scene along each line sample in the set of line samples to form a view of the object scene;

wherein the computing step comprises:
  isolating a segment of the line sample that overlaps an object and
  calculating a distance of the object from the segment; and
setting a maximum distance value associated with the line sample to the distance of the object from the segment.

102. The method of claim 101, further comprising resetting the maximum distance value associated with the line sample when an old segment associated with the maximum distance is overlapped by a new segment such that the object associated with the new segment is closer to the line sample along the overlap.

103. The method of claim 102, wherein the maximum distance value is reset to a distance of the object associated with the new segment from the object scene.

104. A method of forming a view of an object scene, comprising:
  distributing a set of line samples across an object scene such that the distribution of the set of line samples is non-regular;
  computing a view of the object scene along each line sample in the set of line samples;
  combining the view of object scene along each line sample in the set of line samples to form a view of the object scene;
  wherein the computing step comprises:
    isolating a segment of the line sample that overlaps an object and
    calculating a distance of the object from the segment; and
  setting a maximum distance value associated with an area of the object scene including the line sample to the distance of the object from the segment.

105. The method of claim 104, wherein the region of the object scene comprises one or more sub-pixels.

106. The method of claim 104, wherein the region of the object scene comprises one or more pixels.

107. A method of sampling an object scene, comprising:
  projecting objects in an object scene onto an image plane;
  subdividing the image plane to form a grid;
  positioning a line sample in each cell of the grid, wherein the line sample is positioned by:
    orienting the line sample by reference to a non-regular sequence of numbers;
    translating the line sample within the cell such that an intersection of the line sample and the grid form an area; and
    determining the object scene along the line sample in each cell of the grid,
  wherein the line sample resides entirely within the image plane.

108. The method of claim 107, wherein the translating step comprises
  selecting the area formed by the intersection of the line sample and the grid by reference to a non-regular sequence of numbers; and
  deriving a translation amount from the selected area.

109. The method of claim 107, wherein the translating step comprises
  determining a maximum translation amount, the maximum translation amount a function of the orienting step; and
  selecting a translation amount within the maximum translation amount by reference to a non-regular sequence of numbers.

110. A method of sampling object scene data, comprising:
  distributing a set of line samples, each having an orientation, across an image plane such that the distribution of the orientations of the line samples is non-regular, wherein the line samples reside entirely within the image plane;
  projecting objects defined in object scene data onto the image plane;
  computing a view of objects each line sample in the set of line samples overlaps; and
  combining the view of objects each line sample overlaps.

111. A method of defining an array of pixels from object scene data, comprising:
  distributing orientations of a set of line samples across the array of pixels in a non-regular pattern, wherein distributing includes:
    projecting objects in an object scene onto an image plane; and
    orienting the set of line samples on the image plane, wherein the set of line samples reside entirely within the image plane;
  computing a view of an object scene overlapped by each line sample in the set of line samples; and
  combining the view of the object scene overlapped by a subset of line samples from the set of line samples for each pixel in the array of pixels.

112. A method of forming a video image frame, wherein characteristic information of each pixel is determined by line sampling object scene data, wherein a line sample is oriented within a boundary of each pixel in a non-regular pattern, wherein the line sample resides entirely within the video image frame.

113. A method of forming a video image frame that specifies characteristic information of each pixel of an array of pixels that forms the video image frame, wherein the characteristic information of each pixel is determined by line sampling object scene data, wherein the object scene data includes information about changes in an object scene that occur during a time period of the video image frame, wherein a line sample is oriented within each pixel and distributed within the time period by reference to a non-regular sequence of numbers, wherein the line sample resides entirely within the video image frame, whereby any motion blur of the object scene is included in the video image frame.

114. A method of forming a view of an object scene, comprising
  establishing a plurality of characteristics of an optical imaging system including an aperture size, an image plane, and a focal plane relative to objects in an object scene;
  positioning a set of line samples, each having an orientation, across the image plane such that the distribution of the orientations of the set of line samples is non-regular, wherein the line samples reside entirely within the image plane;
  determining a view of the objects along each line sample in the set of line samples by reference to the position of an object in the object scene and the plurality of characteristics of the optical imaging system; and
  combining the view of the object scene along each line sample in the set of line samples.

115. A method of forming a view of an object in an object scene, comprising
  orienting a line sample on an image plane by reference to a non-regular sequence of numbers, wherein the line samples reside entirely within the image plane;

establishing a plurality of characteristics of an optical imaging system including an aperture size and a focal plane relative to an object in an object scene;

selecting for the line sample a position on the optical imaging system through which to project the object in the object scene onto the image plane;

transforming the object by reference to the selected position on the optical imaging system while projecting the object onto the image plane; and determining a view of the object along the line sample.

116. A method of forming a video image frame that specifies characteristic information of each pixel of an array of pixels that forms the video image frame;

wherein characteristic information of each pixel is determined by line sampling object scene data at a position within a boundary of each of said pixels, wherein said position and an orientation of the line sampling are selected by reference to a non-regular sequence of numbers, wherein the line sampling is entirely within the video image frame; and wherein the characteristic information of each pixel is further determined by point sampling the object scene data.

117. A method for line sampling image data in a computer system for determining characteristic information of a pixel, comprising: defining a plurality of sample areas comprising at least a portion of a pixel;

selecting line sample positions and orientations within said areas such that the distribution of line samples is non-regular, wherein the line samples reside entirely within the pixel; and combining characteristic information of the line samples in the pixel, thereby to determine characteristic information of the pixel.

118. A method of forming a video image frame that specifies characteristic information of each area of an array of areas that form the video image frame, comprising defining a plurality of substantially non-overlapping portions within said areas; assigning a line sample to a non-overlapping portion by reference to a non-regular sequence of numbers;

sampling object scene data at each line sample in a non-overlapping portion; and combining object scene data along a set of line samples from each area.

119. A method of forming a video image frame that specifies characteristic information of each pixel of an array of pixels that forms the video image frame, including positioning line samples in a non-regular distribution of orientations across the video image frame, wherein the line sample resides entirely within the video image frame;

distributing line samples in a non-regular, temporal distribution within a time period associated with the video image frame; and combining object scene data along each line sample to determine characteristic information of each pixel in the array of pixels.

120. A computer program product for use in conjunction with a computer system, the computer program product comprising a computer readable storage medium and a computer program mechanism embedded therein, the computer program mechanism comprising:

instruction for projecting objects in an object scene onto an image plane;

instructions for subdividing the image plane to form a grid;

instructions for positioning a line sample in each cell of the grid, wherein the line sample is positioned by orienting the line sample by reference to a non-regular sequence of numbers;

translating the line sample within a cell of the grid such that an intersection of the line sample and the grid form an area; and instructions for determining the object scene along the line sample in each cell of the grid, wherein the line sample resides entirely within the image plane.

121. A computer program product for use in conjunction with a computer system, the computer program product comprising a computer readable storage medium and a computer program mechanism embedded therein, the computer program mechanism comprising:

instructions for distributing a set of line samples, each having an orientation, across an image plane such that the distribution of the orientations of the line samples is non-regular, wherein the line sample resides entirely within the image plane;

instructions for projecting objects defined in object scene data onto the image plane; instructions for computing a view of objects each line sample in the set of line samples overlaps; and instructions for combining the view of objects each line sample overlaps.

122. A computer program product for use in conjunction with a computer system, the computer program product comprising a computer readable storage medium and a computer program mechanism embedded therein, the computer program mechanism comprising:

instructions for distributing orientations of a set of line samples across an array of pixels in a non-regular pattern, wherein the line samples reside entirely within the array of pixels;

instructions for computing a view of an object scene overlapped by each line sample in the set of line samples; and instructions for combining the view of the object scene overlapped by a subset of line samples from the set of line samples for each pixel in the array of pixels.

123. A computer program product for use in conjunction with a computer system, the computer program product comprising a computer readable storage medium and a computer program mechanism embedded therein, the computer program mechanism comprising instructions for determining characteristic information of each pixel in an array of pixels by line sampling object scene data, wherein the instructions orient a line sample within a boundary of each pixel in a non-regular pattern, wherein the line sample resides entirely within the pixel.

124. A computer program product for use in conjunction with a computer system, the computer program product comprising a computer readable storage medium and a computer program mechanism embedded therein, the computer program mechanism comprising instructions for line sampling object scene data to determine characteristic information of each pixel in an array of pixels that forms a video image frame, wherein the object scene data includes information about changes in an object scene that occur during a time period of the video image frame, and wherein the instructions orient a line sample within each pixel and distributes the line sample within the time period by reference to a non-regular sequence of numbers, wherein the line sample resides entirely within the pixel.

125. A computer program product for use in conjunction with a computer system, the computer program product comprising a computer readable storage medium and a computer program mechanism embedded therein, the computer program mechanism comprising:
  instructions for establishing a plurality of characteristics of an optical imaging system including an aperture size, an image plane, and a focal plane relative to objects in an object scene;
  instructions for positioning a set of line samples, each having an orientation, across the image plane such that the distribution of the orientations of the set of line samples is non-regular, wherein the line samples reside entirely within the image plane;
  instructions for determining a view of the objects along each line sample in the set of line samples by reference to the position of an object in the object scene and the plurality of characteristics of the optical imaging system; and
  instructions for combining the view of the object scene along each line sample in the set of line samples.

126. A computer program product for use in conjunction with a computer system, the computer program product comprising a computer readable storage medium and a computer program mechanism embedded therein, the computer program mechanism comprising:
  instructions for orienting a line sample on an image plane by reference to a non-regular sequence of numbers, wherein the line sample resides entirely within the image plane;
  instructions for establishing a plurality of characteristics of an optical imaging system including an aperture size and a focal plane relative to an object in an object scene;
  instructions for selecting for the line sample a position on the optical imaging system through which to project the object in the object scene onto the image plane;
  instructions for transforming the object by reference to the selected position on the optical imaging system while projecting the object onto the image plane; and
  instructions for determining a view of the object along the line sample.

127. A computer program product for use in conjunction with a computer system, the computer program product comprising a computer readable storage medium and a computer program mechanism embedded therein, the computer program mechanism comprising instructions for forming a video image frame that specifies characteristic information of each pixel of an array of pixels that forms the video image frame, wherein the instructions determine characteristic information of each pixel by line sampling object scene data at a position within a boundary of each of said pixels and by point sampling object scene data at a position within the boundary of each of said pixels, wherein the line sampling is accomplished with line samples having non-regular orientations, wherein the line sampling resides entirely within each pixel.

128. A computer program product for use in conjunction with a computer system, the computer program product comprising a computer readable storage medium and a computer program mechanism embedded therein, the computer program mechanism comprising:
  instructions for defining a plurality of sample areas comprising at least a portion of a pixel;
  instructions for selecting line sample positions and orientations within said areas such that the distribution of line samples is non-regular, wherein the line samples resides entirely within the pixel; and
  instructions for combining characteristic information of the line samples in the pixel, thereby to determine characteristic information of the pixel.

129. A computer program product for use in conjunction with a computer system, the computer program product comprising a computer readable storage medium and a computer program mechanism embedded therein, the computer program mechanism comprising:
  instructions for defining a plurality of substantially non-overlapping portions within an area of an array of areas that form a video image frame;
  instructions for assigning a line sample to a non-overlapping portion by reference to a non-regular sequence of numbers;
  instructions for sampling object scene data at each line sample in a non-overlapping portion; and
  instructions for combining object scene data along a set of line samples from each area.

130. A computer program product for use in conjunction with a computer system, the computer program product comprising a computer readable storage medium and a computer program mechanism embedded therein, the computer program mechanism comprising:
  instructions for positioning line samples in a non-regular, distribution of orientations across an array of pixels that form a video image frame, wherein the line samples reside entirely within the video frame image;
  instructions for distributing line samples in a non-regular, temporal distribution within a time period associated with the video image frame; and
  instructions for combining object scene data along each line sample to determine characteristic information of each pixel in the array of pixels.

131. A computer program product for use in conjunction with a computer system, the computer program product comprising a computer readable storage medium and a computer program mechanism embedded therein, the computer program mechanism comprising:
  instruction for projecting objects in an object scene onto an image plane;
  instructions for distributing a set of line samples, each having an orientation, across the image plane such that the distribution of the orientations of the set of line samples is non-regular, wherein the line samples reside entirely within the image plane;
  instructions for computing a view of the object scene along each line sample in the set of line samples; and
  instructions for combining the view of the object scene along each line sample in the set of line samples to form a view of the object scene.

* * * * *